(12) United States Patent
Frenken

(10) Patent No.: US 6,230,542 B1
(45) Date of Patent: May 15, 2001

(54) HYDRAULIC APPARATUS

(75) Inventor: Egbert Frenken, Wermelskirchen (DE)

(73) Assignee: Gustav Klauke GmbH (DE)

( * ) Notice: Subject to any disclaimer, the term of this patent is extended or adjusted under 35 U.S.C. 154(b) by 0 days.

(21) Appl. No.: 09/448,187

(22) Filed: Nov. 23, 1999

Related U.S. Application Data

(63) Continuation of application No. 09/319,908, filed on Aug. 10, 1999.

(30) Foreign Application Priority Data

Jun. 10, 1999 (DE) .............................. 199 26 481

(51) Int. Cl.$^7$ .............................. B21D 37/06; B21J 13/04
(52) U.S. Cl. ..................... 72/456; 72/409.16; 72/416; 72/453.16; 30/228; 83/635
(58) Field of Search ................... 72/453.16, 416, 72/456, 409.16; 30/228, 241, 181, 182; 83/635

(56) References Cited

U.S. PATENT DOCUMENTS 2,722,859 * 11/1955 Stoltz ............................ 72/453.16
3,267,573 * 8/1966 Hill ..................................... 30/228
3,919,877 * 11/1975 Netta ................................. 72/456
4,292,833 * 10/1981 Lapp ................................. 72/416
4,779,502 * 10/1988 Hebert .............................. 83/635
5,457,889 * 10/1995 Kimura .............................. 30/228
5,722,170 * 3/1998 Smith ................................ 30/228

* cited by examiner

Primary Examiner—David Jones
(74) Attorney, Agent, or Firm—Trexler, Bushnell, Giangiorgi, Blackstone & Marr, Ltd.

(57) ABSTRACT

A hydraulic apparatus for pressing or cutting workpieces, the apparatus having a mounting head for use with tools which can be moved against one another. The tools being arranged in the mounting head in a manner laterally offset from one another to allow them to move past each other. As a result of this configuration, there is provided, increased utility value, especially when using cutting tools. The tools are guided in grooves formed next to each other in the first embodiment. In this regard it is possible for a groove to be associated with each tool. In a second embodiment it is provided that the tools are guided in a common groove with additional support on opposite outer surface walls.

13 Claims, 17 Drawing Sheets

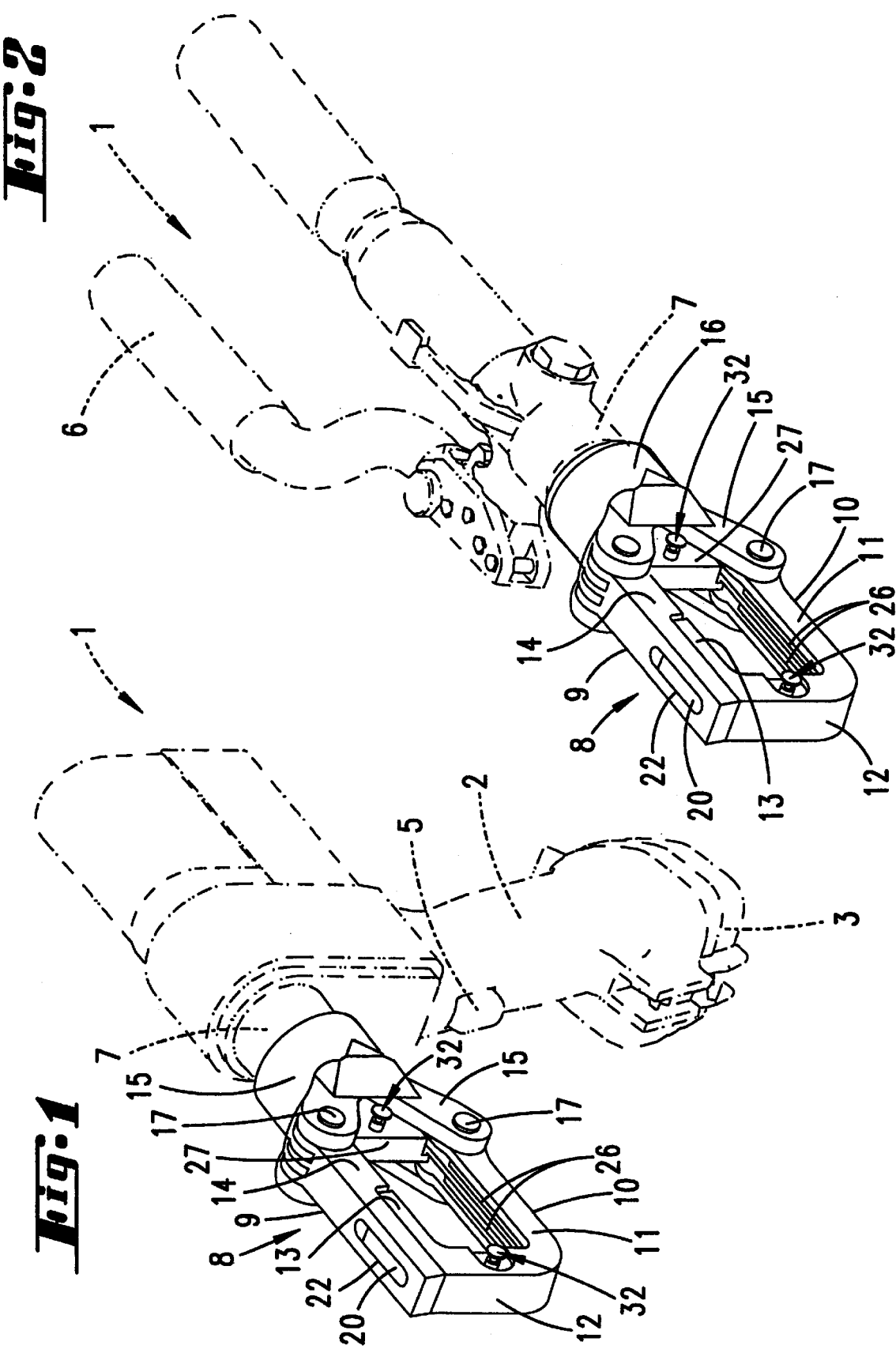

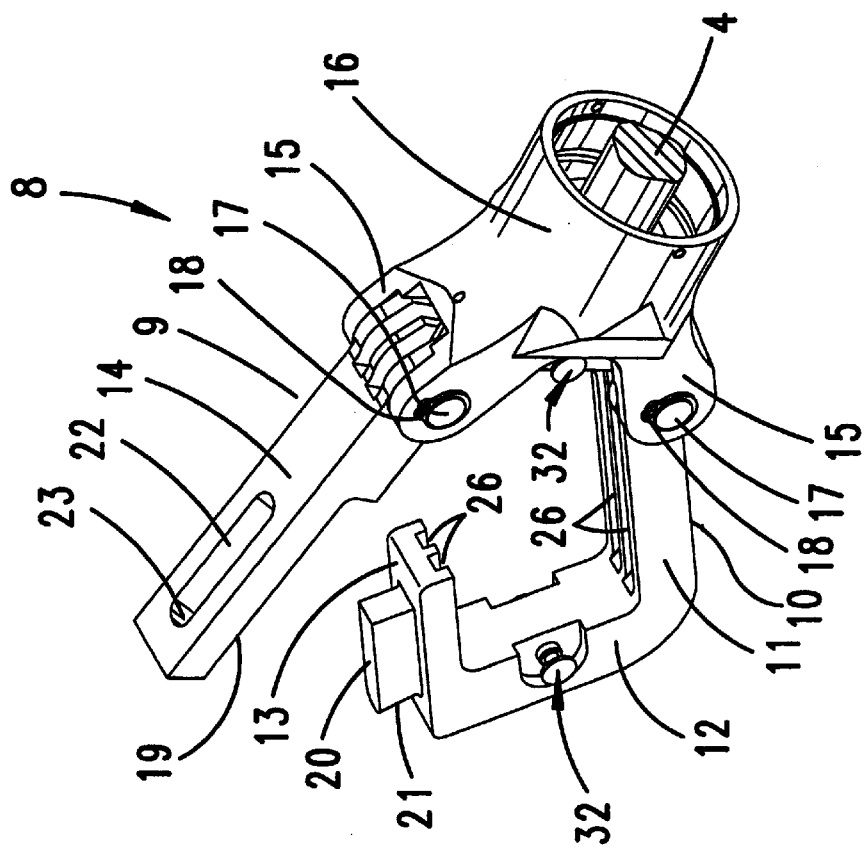
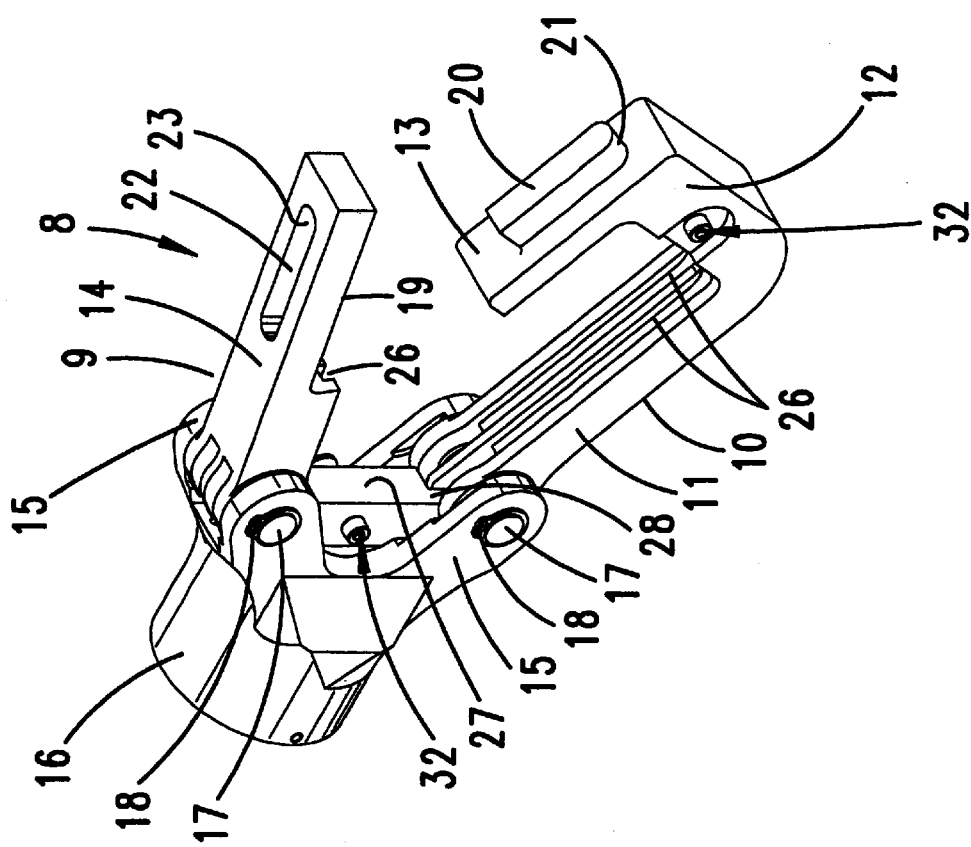

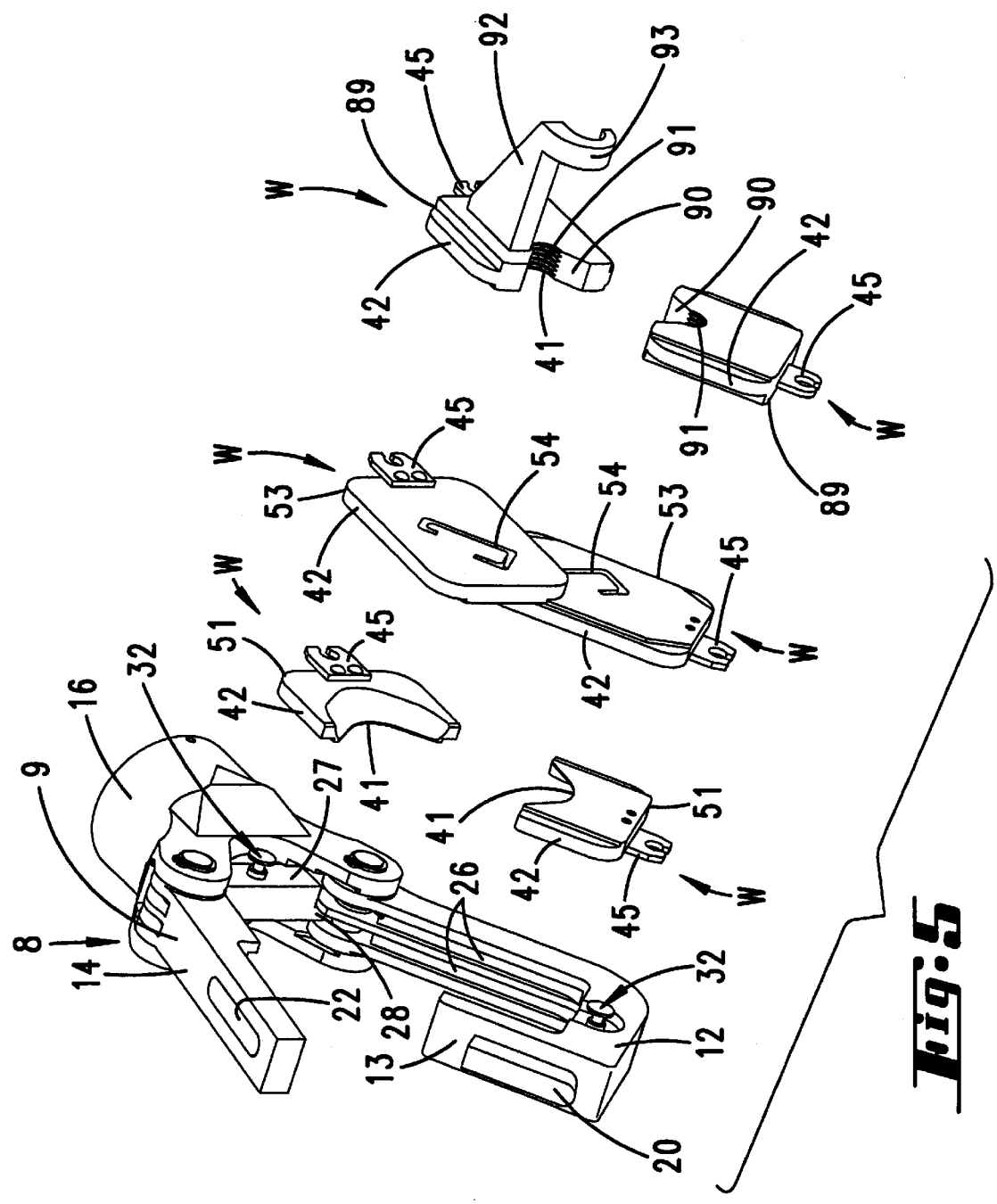

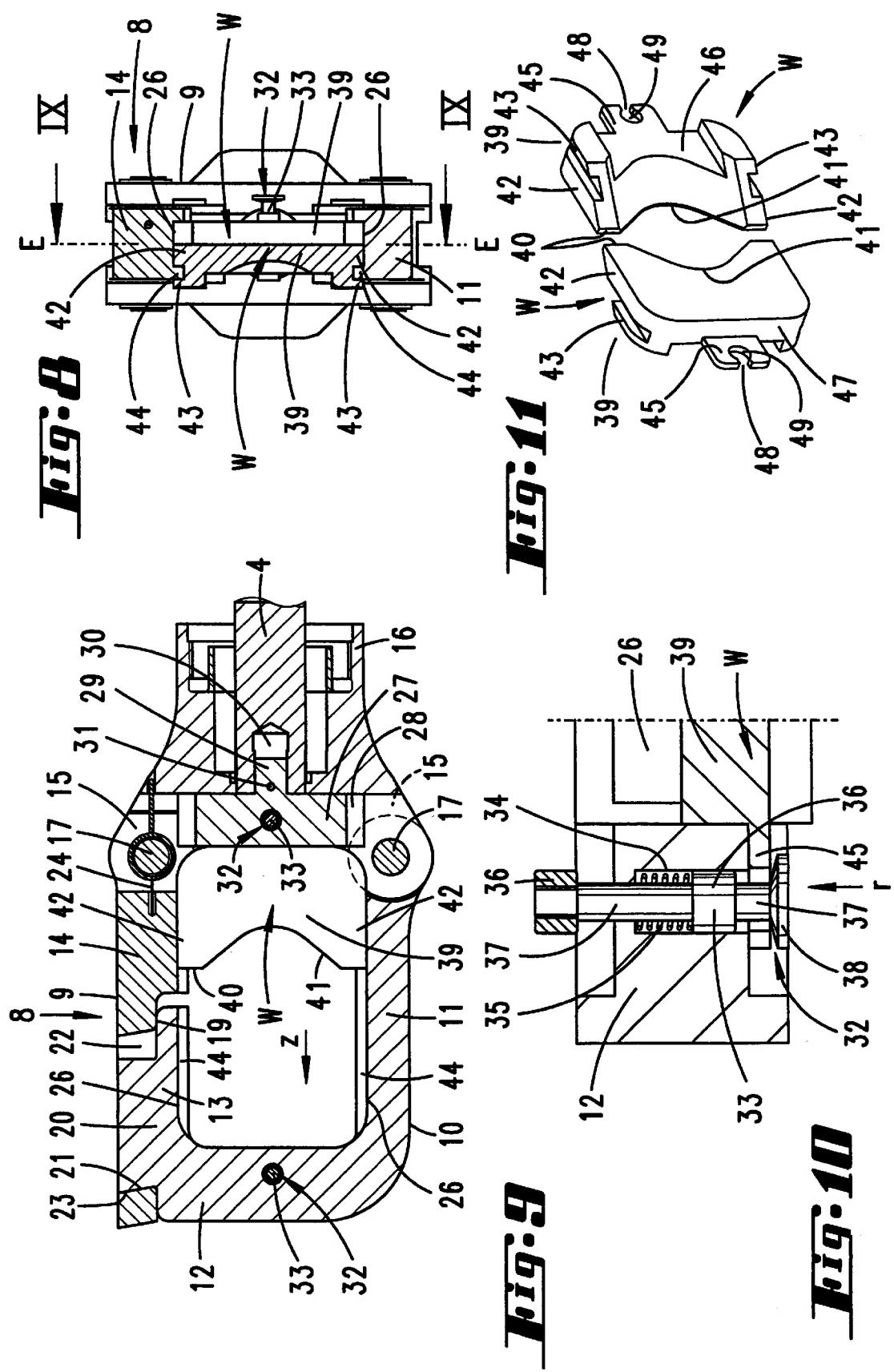

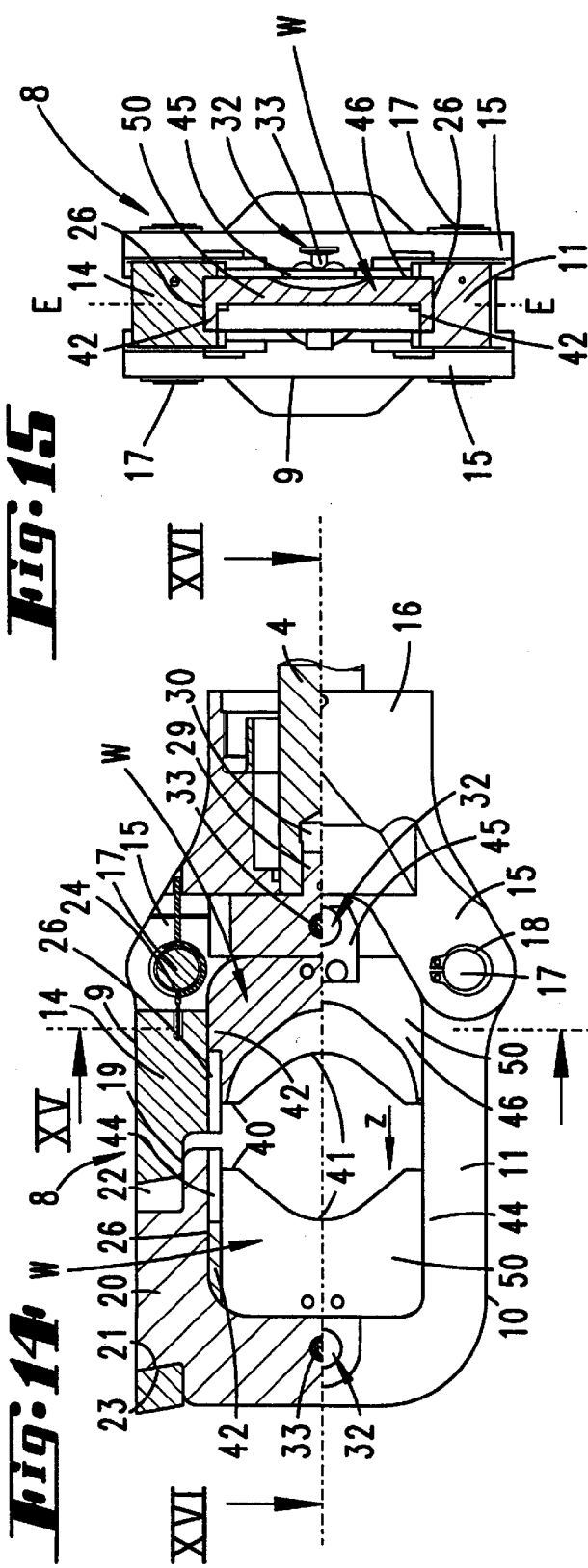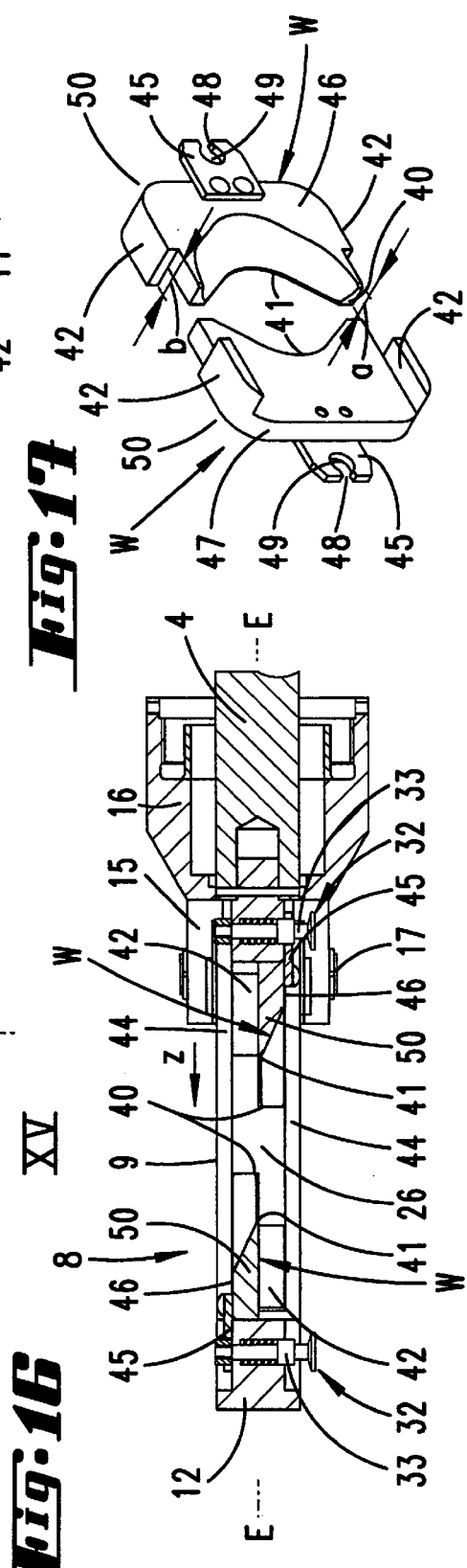

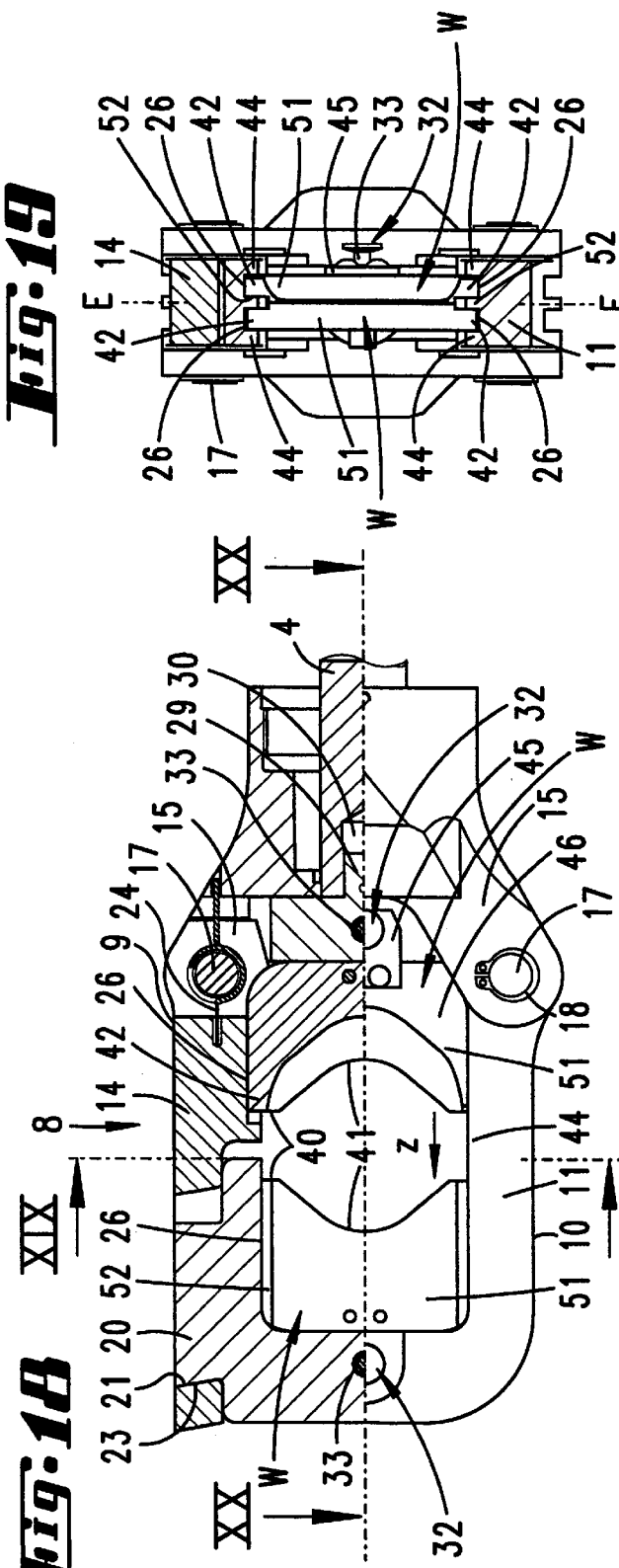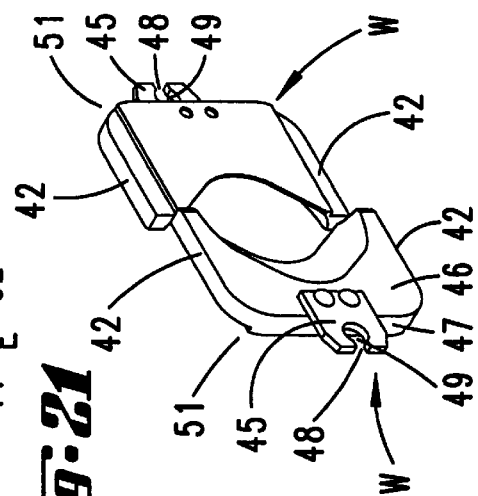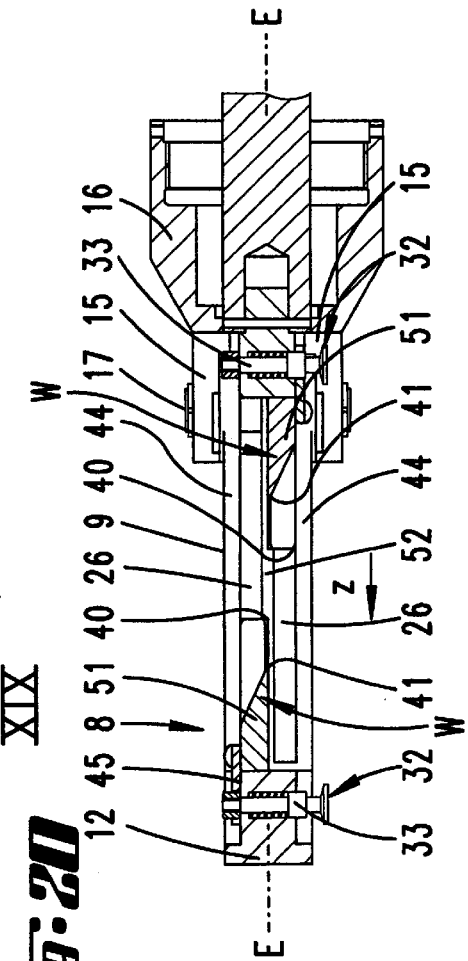

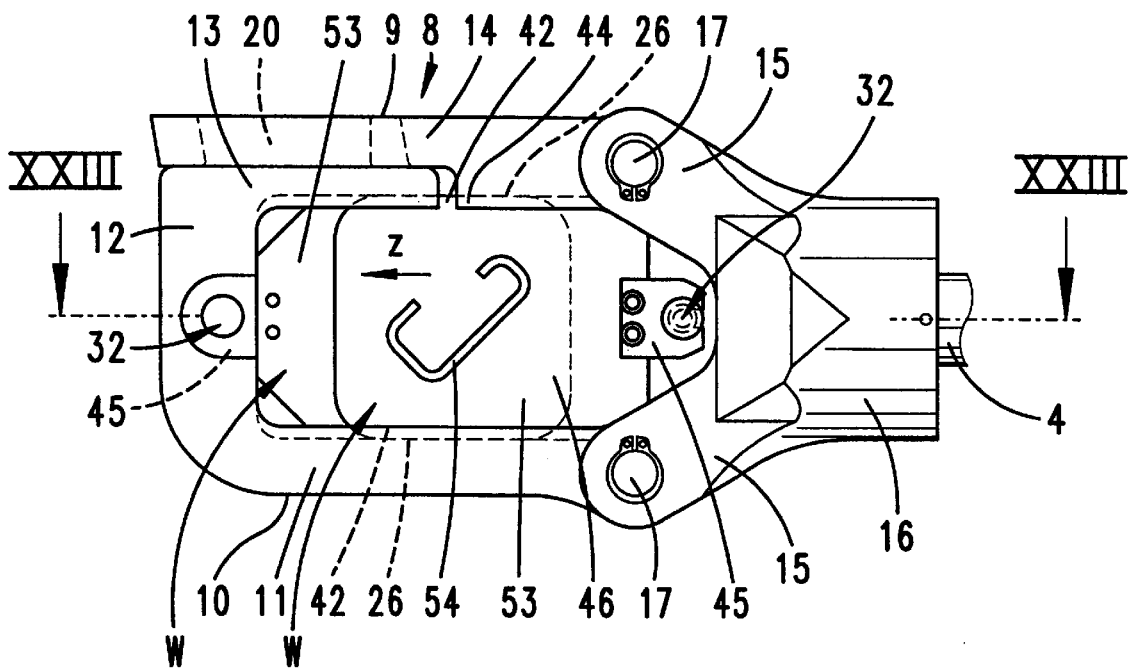
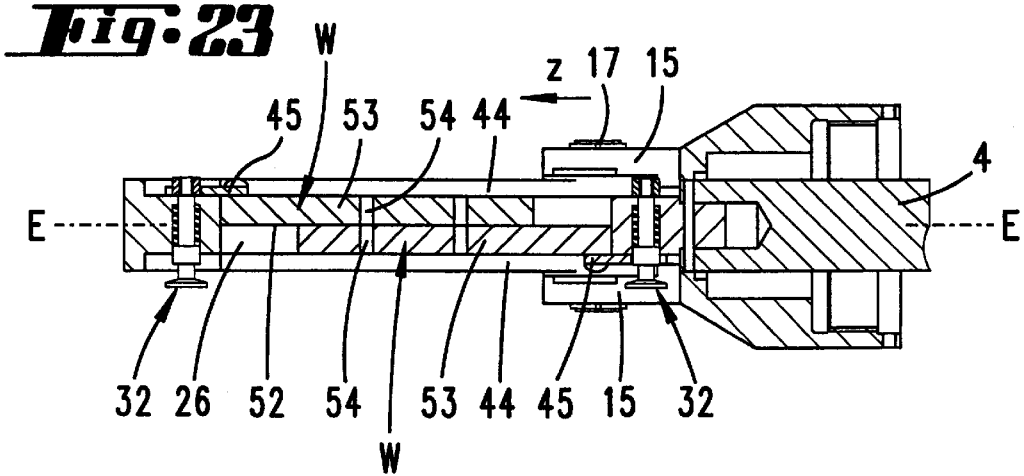

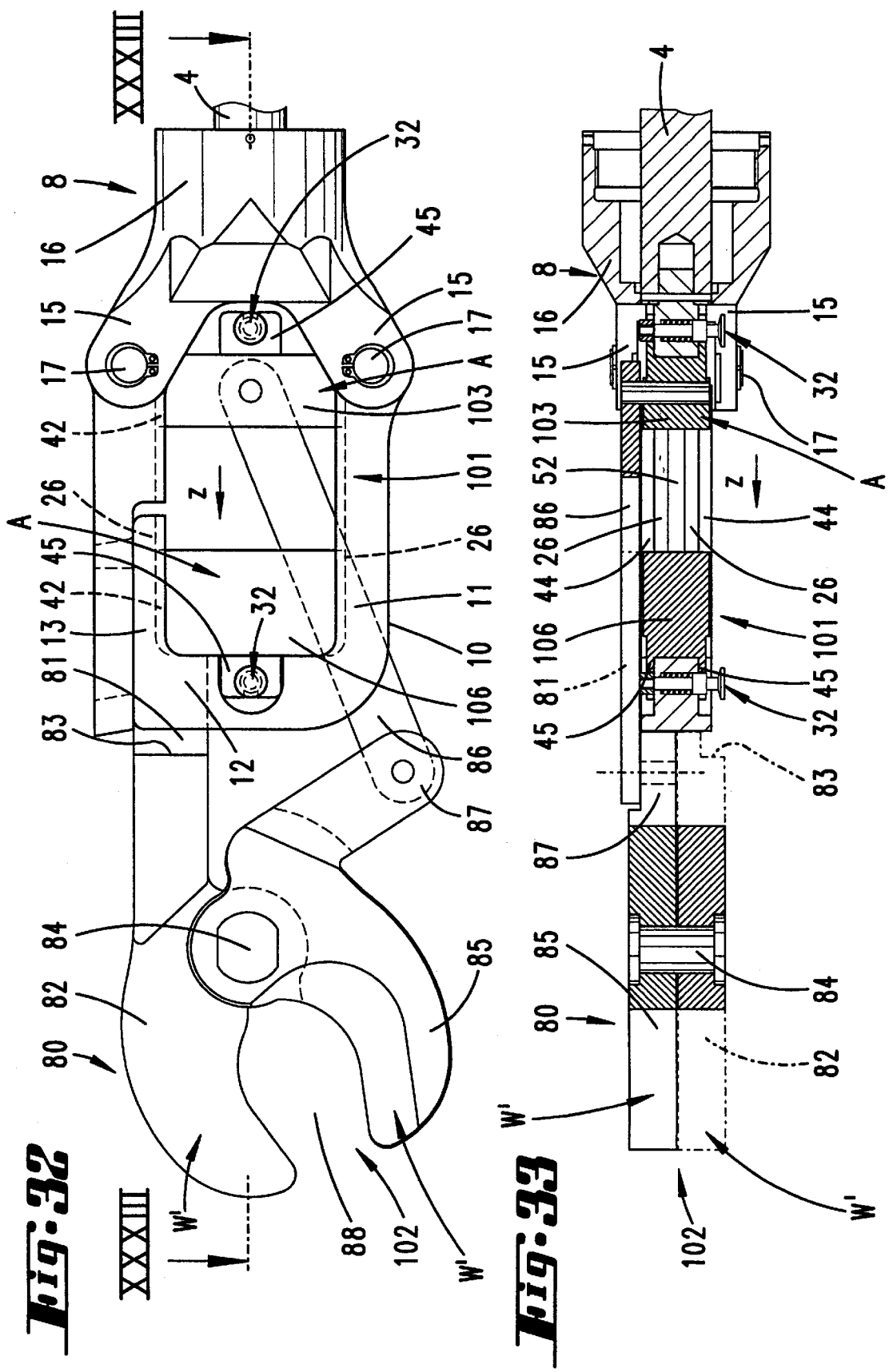

US 6,230,542 B1

HYDRAULIC APPARATUS

This application is a continuation of Ser. No. 09/319,908 filed Aug. 10, 1999.

BACKGROUND

The invention relates first of all to a hydraulic apparatus, for example for pressing or cutting workpieces, with a mounting head for tools which can be moved against one another.

An apparatus of this kind is known, for example, from German Patent Application 198 25 160, which corresponds to U.S. application Ser. No. 09/319,908, Aug. 10, 1999. The content of this patent application is hereby incorporated as to its full content into the disclosure of the present invention.

With regard to the prior art described above, one technical problem for the invention is seen in improving the construction of a hydraulic apparatus of the type under discussion, particularly as regards its technical functioning.

SUMMARY

This problem is solved first and foremost by the fact that the tools can be arranged in the mounting head in a manner laterally offset from one another in order, in the case of cutting tools, to allow them to move past one another. As a result of this configuration, there is provided increased utility value for the hydraulic apparatus, especially when using cutting tools. In the case of a cutting operation, a movable cutting tool is displaced at least until its cutting edge moves behind the cutting edge associated with the fixed tool. This makes it possible to cut workpieces, such as solid or hollow sectional bars, to length cleanly and without burrs. The fact that the cutting tools can be moved past one another leads to a shearing division of the workpiece. The laterally offset arrangement of the tools relative to one another in the mounting head is furthermore also conceivable in the case of tools for pressing workpieces. The arrangement chosen also makes it possible to insert in the mounting head tools for other non-cutting operations on workpieces, bending tools for example. In a first embodiment, the tools are guided in grooves formed next to one another. In this regard, it is possible for a groove to be associated with each tool. However, it is furthermore also conceivable, given the formation of two grooves arranged next to one another, to associate these two tools in such a way that they are guided in common grooves formed beside one another. As a further embodiment of the subject matter of the invention, it is provided that the tools are guided in a common groove with additional support on opposite outer surfaces of groove walls. Irrespective of the number of grooves, they run in the direction of displacement of the tool or tools in the mounting head. Where the tools are arranged in a common groove, each tool preferably also engages over the associated groove wall bounding the groove to provide additional support against the outer surface of the groove wall. Metaphorically speaking, the construction is chosen in such a way that the workpiece, the groove and the groove wall of the mounting head forms a guide rail for the tool in the form of a tongue. Provision is furthermore made for grooves or guide structures for the tools to extend in the direction of displacement and to be provided on both sides of the tools, in order to provide tilt-free guidance of the tools. Where the tools are arranged in a common groove, the tool section sliding in the groove preferably corresponds to no more than half the width of the groove, so that both tools may be moved fully past one another. In another embodiment, it may be provided that the tools are guided in a common groove and interpenetrate one another. Accordingly, the tools are shaped in such a way that in particular the operative regions of the tools, for example the cutting edges of cutting tools, can enter into the region of the other tool. Thus, for example, provision is made for the tools to have guiding sections in the form of tongues for guidance in the common groove only in the end regions which are directed away from each other. These guiding sections extend over the entire width of the groove, whereas the actual operative region preferably corresponds to half the width of the groove, to allow the operative regions of the tools to move past one another. In an advantageous development of the subject matter of the invention, it is provided that the mounting head is formed as a closable rectangular guide. In this way, on the one hand, insertion of the various tools is facilitated, and, on the other hand, by means of the opened rectangular guide, the apparatus can be placed against the workpiece to be pressed or cut. This is of advantage, particularly in the case of very long workpieces or those in locations to which it is difficult to gain access. After it has been placed against them, the mounting head formed as a rectangular guide is closed, after which, as a further feature of the subject matter of the invention, the displaceable tool is acted upon in the rearward direction by a ram which can be actuated by means of the hydraulic apparatus. After the rectangular guide is closed, the direction of displacement of the movable tool runs in extension of the direction of displacement of the ram. The movement concerned is preferably a linear displacement of the ram and of the displaceable tool towards a fixed tool. Where the mounting head is formed as a rectangular guide, the longer side of the rectangle is aligned in the direction of displacement, at least in the closed position of the mounting head. A quadratic shape of the mounting head when viewed transversely to the direction of displacement of the tools is furthermore also conceivable. It is also possible to conceive of arrangements of the mounting head in which the displacement of the tools is effected in a nonlinear manner, for example in the form of a cam-guided displacement. In the preferred configuration of the mounting head as a rectangular guide, provision is made for the rectangular guide to be of three-piece construction, one piece being provided as an angled piece which encloses one longitudinal side, one piece being provided as a narrow-side piece and one piece being provided as a longitudinal-side piece. In this regard, it is furthermore preferred for the narrow-side piece to provide joints at each of its ends for the angled piece and for the longitudinal-side piece. It is proposed here that the narrow-side piece be provided in the region that can be associated with the apparatus. The narrow-side piece can furthermore be provided in the form of two lug-like plates which enclose end regions of the angled piece and of the longitudinal-side piece between them, the ram which can be moved by the hydraulic apparatus entering the guide space of the mounting head in the intermediate space provided between these plates. As a development of the subject matter of the invention, provision is made for the angled piece to provide a portion of a longitudinal side which overlaps with the longitudinal-side piece. As a consequence of this, the angled piece is formed to be substantially U-shaped in a side view transverse to the direction of displacement, with one U limb forming a longitudinal side which is arranged to be shorter than the other U limb, the free end of the other U-limb being provided with a bearing feature to allow pivoting displacement of the angled piece in the region of the narrow-side piece. In the closed position of the mounting head or rectangular guide, the shorter U limb coincides with the longitudinal-side piece, which is likewise mounted in a pivoting manner on the narrow-side piece, this position preferably furthermore being secured by positive locking. Thus, for example, one longitudinal side of the angled piece can have an upper projection which is provided with an undercut and enters into a correspondingly formed groove in the longitudinal-side piece. The pieces—angled piece and longitudinal-side piece—which are subject to spring-loading in the opening direction, are held in the closed position by the selected undercut. This position can only be released by deliberate action. To fix the tools in the mounting head, securing means for securing a tool in the mounting head are provided, in each case opposite one another, on the narrow-side piece of the mounting head. A configuration is preferred here in which a securing means is provided on the ram side for the tool to be acted upon by the ram and thus displaced, and a further fixing means for a fixed tool is, on the other hand, provided in the region of the U-limb of the angled piece which simultaneously forms a narrow-side piece. A configuration which is preferred here is one in which the securing means is formed as a positive-locking pin which can be displaced transversely to the direction of motion of the tools. This is furthermore preferably in the form of a pin which has zones of reduced diameter in a longitudinal direction and is biassed by a spring in the direction of positive-locking engagement. Provision can furthermore be made for this positive-locking pin to be formed and arranged in such a way that by using it, there can be effected both fixing of the associatable tool to one or the other side of the narrow-side piece or of the ram and, furthermore, fixing of it on both sides at the same time.

The invention furthermore relates to a hydraulic apparatus, for example for pressing or cutting workpieces for instance, with a mounting head for tools which can be moved against one another, both cutting and pressing tools being disposable in the mounting head. As an advantageous development of the subject matter of the invention, it is proposed here that force-dependent control of the apparatus is effected both during a cutting operation and during a pressing operation. As a consequence of this, its operation is not dependent on the drive path of the ram or of the tool that can be displaced by the ram. As a consequence, various tools with various displacements can be inserted and used in an extremely simple manner.

The invention furthermore relates to a tool or adaptor for receiving a tool for securing in a mounting head. For advantageous development of a tool or adaptor of this kind, a fork-shaped mounting lug projecting in the direction of displacement is here proposed which has an enlarged retaining opening starting from a smaller insertion opening. This retaining opening, which preferably cooperates with a positive-locking pin of the mounting head, serves to fix the tool in the mounting head, thus for example to locate the tool on the mounting head as a fixed tool or to locate a tool on a ram projecting into the mounting head to form a displaceable tool. The positive-locking pin cooperating with the mounting lug has a region of reduced cross section in the longitudinal direction of the pin, the diameter of which corresponds approximately to that of the smaller insertion opening of the mounting lug. To fix the workpiece, the positive-locking pin is displaced in such a way that the region of reduced cross section can be traversed by the smaller insertion opening of the mounting lug for final entry of the positive-locking pin into the enlarged retaining opening. The positive-locking pin is displaced back into the original position, preferably with spring assistance, positive engagement being effected between the pin area of enlarged cross section and the enlarged retaining opening. As a further embodiment of the subject matter of the invention, provision is made for the mounting lug to be arranged relative to the tool or to the adaptor so as to project transversely to the direction of displacement. As a result of this, there is provided increased width of the mounting lug. In this regard, the mounting lug can be provided as a separate part which is, for example, rivetted to the tool. As an alternative, the construction can also be chosen in such a way that the mounting lug is formed to be aligned with the outer surface of the tool or of the adaptor. According to this, it is preferred that the mounting lug be formed integrally with the tool. The tool and the adaptor have means for guiding them in the mounting head. In regard to a plan view of these guide means, the mounting lug preferably extends to the side of the guide means and with a parallel offset relative to the means. It is furthermore proposed that two oppositely-located mounting lugs be provided. According to this, the tools grip over the associated sections of the mounting head in the region of their mounting lugs. As regards the guide structures, it is proposed that the tool or the adaptor have one or, optionally, two tongues located beside one another and extending in the direction of displacement of the tool or of the adaptor, these tongues resting in one or, if appropriate, two mutually adjacent grooves in the mounting head to form a tongue-and-groove arrangement. As a development of the subject matter of the invention, provision is made for the tool or the adaptor to have a tool working width which is less than the tongue width. Thus, for example, the tool working width can correspond approximately to half the tongue width, and it is furthermore preferred that the working section of the tool be aligned on one side with a tongue outer surface and thus extend approximately as far as the centre of the tongue in the width direction. As an alternative, the arrangement can also be chosen in such a way that the tool working width is adapted to approximately correspond to the tongue width. It is furthermore proposed that the tongue extend over only part of the length of the tool or of the adaptor, for example over half the length of the tool as viewed in the direction of displacement of the tool. Provision can furthermore be made for the adaptor to have a projecting shoulder on both sides of the tongue. The tool accordingly has a total width which extends beyond the width of the tongue and the tool is thus supported in the mounting head in the region of the projecting shoulder on the groove flanks, which receive the tongue between them. As an alternative, it is also possible for the side face of the adaptor to be aligned with the side face of the tongue. The adaptor according to the invention is furthermore formed in such a way that it allows conventional pressing tools—pressing jaws—to be inserted. Thus, for example, positive-locking openings can be provided for the purpose of fixing the tool on the adaptor. This can be for example a kind of catch coupling. A tongue-and-groove connection between tool and adaptor is furthermore also conceivable, the alignment of this groove and tongue preferably being transverse to the direction of displacement. The tool can furthermore be held in the adaptor by latching means, which latching means can be displaced to release the tool only by deliberate action. As regards the fixing of the tool in the adaptor, combinations of the configurations described above can also be used. In this regard, it is furthermore proposed that the securing lug be provided on the tool and that the securing lug engage over the adaptor. The adaptor itself is accordingly not provided with securing lugs and thus serves purely as a guide means in the mounting head. The tool provided with the securing lug, preferably two securing lugs, grips over the adaptor to give positive-locking engagement with the securing means of the mounting head. The tool according to the invention or the tool held by means of the adaptor preferably acts within the mounting head of the apparatus, i.e. the tool working regions, such as cutting edges or pressing jaws, act within the mounting head. As an alternative, however, provision is also made for the tools or tool working regions to operate outside the mounting head, thus for example in the form of a tool of the bolt-cutter type. Here, the only tool members which are displaced within the mounting head are those whose displacement is transmitted for example by a lever arrangement, to cutting or pressing jaws arranged offset relative to the mounting head. Such a configuration can furthermore also be used for punching, for example punching sheet metal. As a consequence, operations may in this way also be performed in a targeted manner without having to open the mounting head, particularly in the case of relatively long workpieces, in order to grasp the workpieces.

The invention furthermore relates to a pair of tools for insertion in a mounting head of a hydraulic apparatus. Here, an advantageous development of the pair of tools according to the invention is provided by cut-outs formed identically in both tools and corresponding to a profile cross section. Such a pair of tools is used, for example, for cutting to length profile stock pieces made, for example, of plastics or aluminium, the cut-outs in the two tools being provided to correspond to the profile cross section of the stock to be cut. In an initial position of the apparatus holding the pair of tools, the cut-outs coincide. The profile stock is then pushed through these as far as the desired position. When the apparatus is actuated, the tools, which are aligned in side by side disposition, are moved past one another, resulting in shearing of the profile stock. Owing to the fact that the cut-outs of the tools are shaped to correspond to the profile cross section, the cutting operation takes place without permanent deformation of the workpiece. Another advantageous configuration is provided by cutting edges formed on end faces, the end faces being opposite one another in the direction of displacement, and the cutting edges extending in a curved manner in the direction of displacement. Cutting edges which extend in a concave manner relative to the respective end face of a tool are preferred here, so that concentric cutting from the outside towards the centre is effected, particularly in the case of workpieces which are circular in cross section. Externally threaded sections which adjoin the cutting edges laterally and are aligned transversely to the direction of displacement furthermore allow threaded rods to be cut to length. For this purpose, the tools are provided with semicircular recesses which are open towards the opposite end faces and have an external thread extending in the transverse direction of the tool. To counteract skewing of the workpiece, e.g. a threaded rod, provision is made for one tool to have a shell-shaped support on the side facing away from the cutting edge, the shell being located at a spacing from and coaxial with the externally threaded section. The support arrangement is preferably effected on the movable tool, a supporting shell which is in the form of a half shell in plan view being chosen. In this arrangement, the shell is aligned counter to the associated externally threaded section, with the radii being substantially the same.

The invention furthermore relates to a tool for securing in a mounting head of a hydraulic apparatus, in particular a hydraulic apparatus according to one or more of claims 1 to 10 or especially according thereto. In this regard, a receiving member to be secured in the mounting head and a working part situated outside the mounting head, such as a cutting jaw or a hole punch, are proposed for the purpose of achieving a technically functional improvement of the subject matter according to the invention. By virtue of this configuration, operations to be carried out by means of the hydraulic apparatus can also be performed outside the region of the mounting head, and linear movements, in particular, can be transmitted in various ways to the working part by the receiving member on the mounting side. Thus, provision is made for the receiving member to comprise a fixed part and a moving part. The displacement of a ram or piston brought about by means of the apparatus leads to the moving part being taken along in the manner already described in the case of the tools or adaptors with tools acting within the mounting head. In a configuration used by way of example, provision can be made for the moving part to be formed as a piston cooperating with a quantity of hydraulic fluid in the fixed part. As an alternative, provision can be made for the moving part to act directly or indirectly by way of linkages on a hydraulic piston. The moving part can furthermore also act on the working part directly or indirectly by way of links or the like. It is furthermore proposed that the tool is a shears-type tool, thus for example a bolt cutter. Thus, provision is made for the fixed part to be connected to a fixed jaw of the shears-type tool. Another proposal in this regard is that the moving part be connected to a pivoting jaw of the shears-type tool. According to the invention, a preferred linear displacement of the moving part accordingly leads by way of appropriately embodied and arranged links/levers to a pivoting displacement of the pivoting jaw relative to the fixed jaw. As an alternative, provision can be made for the tool to be a hole punch. A device of this kind is known from DE-A1 196 49 932. The content of this patent application is incorporated into the disclosure of the present invention, also for the purpose of including features of this patent application in claims of the present invention. It is additionally proposed that the moving part be formed as a cylinder accommodated in the cylinder-like fixed part, thus for example a hydraulic piston.

Finally, the invention relates to a method for cutting by means of a hydraulic apparatus in which tools which can be moved against one another are accommodated in a mounting head. To obtain an improved development of such a method, it is proposed here that, as regards the cutting edges, the tools should be guided past one another in the course of a cutting operation. The guidance of the tools past one another is preferably effected until they reach a position in which—viewed in the direction of displacement, the cutting edge on one tool lies behind the cutting edge of the other tool.

BRIEF DESCRIPTION OF THE DRAWINGS

The invention is explained in greater detail below with reference to the attached drawing, which represents merely a number of exemplary embodiments. In the drawing:

FIG. 1 shows a hydraulic apparatus according to the invention, with a mounting head for receiving tools, the apparatus being operated by means of an electric motor;

FIG. 2 shows another perspective view of a hydraulic apparatus in the form of a manually operated apparatus;

FIG. 3 shows a perspective detail view of the mounting head in an open position;

FIG. 4 shows another perspective view of the mounting head seen from the rear;

FIG. 5 shows a perspective view of the mounting head in open position, with various tools associatable with the mounting head, in the form of cutting tools;

FIG. 8 shows the section according to the line VIII—VIII in FIG. 6;

FIG. 9 shows the section according to the line IX—IX in FIG. 8;

FIG. 10 shows an enlargement of the region X—X in FIG. 7;

FIG. 11 shows a perspective detail view of the tools used in the embodiment according to FIG. 6 to 10;

FIG. 14 shows a partially sectioned side view of the mounting head with tools of a second embodiment;

FIG. 15 shows the section according to the line XV—XV in FIG. 14;

FIG. 16 shows the section according to the line XVI—XVI in FIG. 14;

FIG. 17 shows a perspective detail view of the tools used in the exemplary embodiment according to FIG. 14 to 17;

FIG. 18 shows a partially sectioned view corresponding to that of FIG. 14, with tools in a third embodiment;

FIG. 19 shows the section according to the line XIX—XIX in FIG. 18;

FIG. 20 shows the section according to the line XX—XX in FIG. 18;

FIG. 21 shows a perspective detail view of the tools used in the embodiment according to FIG. 18 to 20;

FIG. 22 shows a side view of the mounting head, with tools of a fourth embodiment;

FIG. 23 shows the section according to the line XXIII—XXIII in FIG. 22;

FIG. 32 shows another side view representation of the mounting head with tools of another embodiment, in which working sections of the tools act outside the mounting head;

FIG. 33 shows the section according to the line XXXIII—XXXIII in FIG. 32;

DESCRIPTION

Figure 5A:
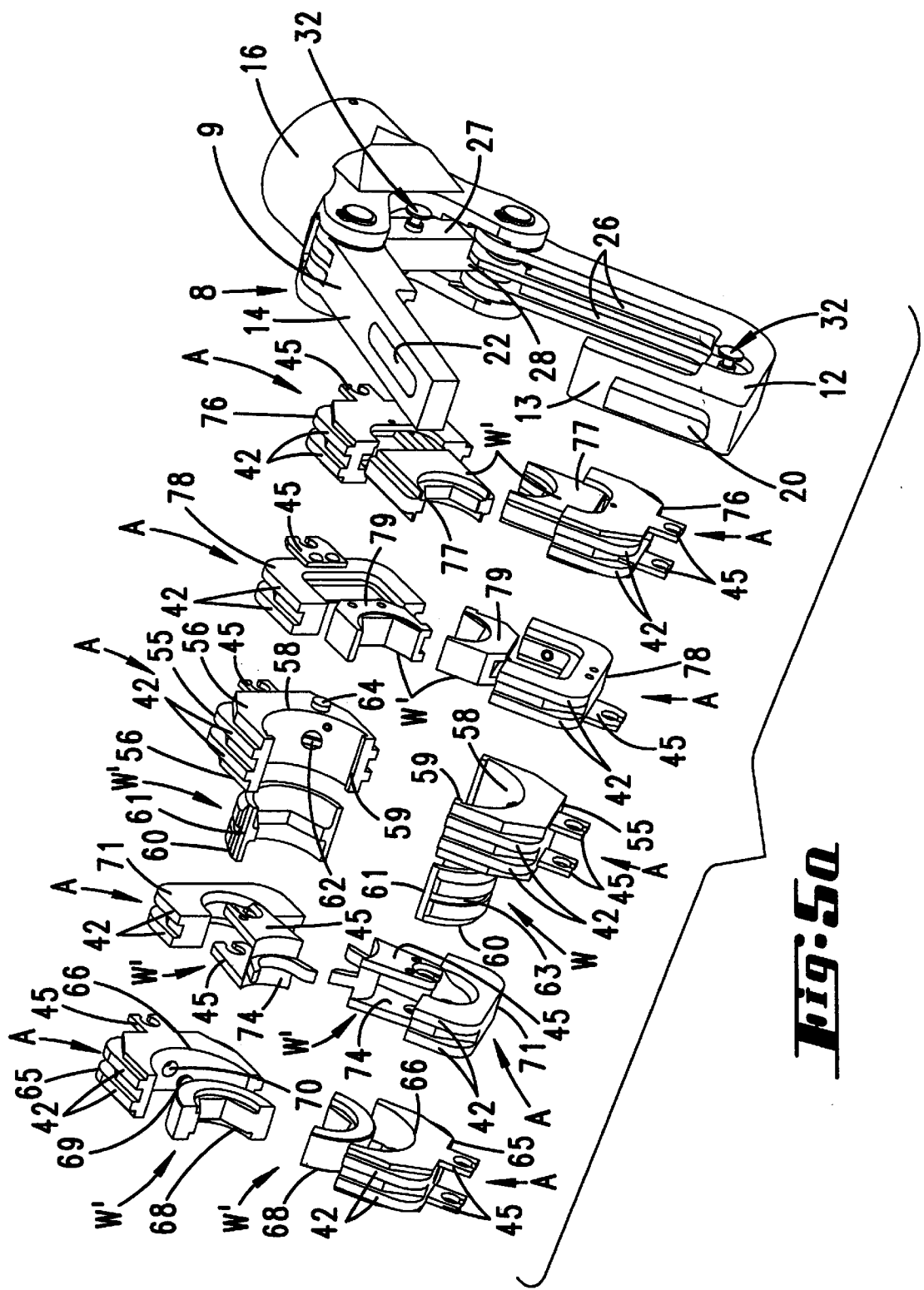
FIG. 5a shows another perspective view of the mounting head in open position, with various adaptors associatable with the mounting head, together with tools in the form of pressing inserts.

There is illustrated and described first and foremost with reference to FIG. 1, a hydraulic apparatus 1 in the form of a manual pressing apparatus, which is operated by electric motor. A pressing apparatus of this kind is known from the German Patent Application mentioned at the outset with the file number 198 25 160.2. Attention is also drawn to German Patent Application 197 43 747. The content of this patent application also is hereby to be incorporated as to its full content into the disclosure of the present invention.

An electric motor is located in the apparatus 1. Drive of this electric motor is effected by means of a battery 3 integrated into a handle 2. When a finger-actuatable switch 5 is actuated, oil is pumped out of a reservoir into a pressure space, whereby a hydraulic cylinder 4 is moved in the direction of its working end position against the action of a return spring.

The return movement of the hydraulic cylinder 4 is effected by a return spring as soon as a return valve opens when a predetermined maximum pressure is exceeded.

The apparatus illustrated in FIG. 2 is formed as a manually actuated apparatus. The pressure required to displace the hydraulic cylinder 4 is accordingly not built up by an electric motor but by manual actuation using a pumping lever 6.

Irrespective of the form of the apparatus 1, it has a neck 7 which surrounds the hydraulic cylinder 4 and on which a mounting head 8 for receiving tools W can be located. The arrangement of the mounting head 8 on the neck 7 is preferably such that the mounting head 8 can be rotated about the axis of the neck.

As can be seen especially from FIGS. 3 and 4, the mounting head 8 is formed substantially as a rectangular guide 9 which can be closed and opened and has a long side which is aligned in elongation of the piston axis and a narrow side, the length of which corresponds approximately to half the length of the longitudinal side of the rectangular guide 9.

The mounting head 8 or the rectangular guide 9 is of substantially three-piece form. One part is formed as an angled piece 10 which includes one longitudinal side and has a longitudinal-side piece 11, a narrow-side piece 12 extending at right angles to the piece 11, and a longitudinal-side portion 13 which runs parallel to the longitudinal-side piece 11 but extends over only about half the length of the piece 11. Consequently, the angled piece 10 is U-shaped in side view, with a longer limb—the longitudinal-side piece 11—and a shorter limb—the longitudinal-side portion 13.

The second part of the rectangular guide 9 forms a longitudinal-side piece 14 with a width, measured transversely to the direction of extent of the rectangular guide 9, i.e. measured transversely to the piston axis, corresponding to that of the angled piece 10.

The third part of the rectangular guide 9 is formed as a second narrow-side piece 15, and, in the particular embodiment example illustrated, two narrow-side pieces 15 are provided, at a spacing from one another. These pieces are connected to one another by a flange 16 of circular cross-section to enable the mounting head 8 to be located on the neck 7. Both the longitudinal-side piece 14 and the angled piece 10 are pivotably mounted in the space formed between the narrow-side pieces 15.

For this purpose, the narrow-side pieces 15 and also a region of the longitudinal-side piece 14 and the free end of the longer U-limb of the angled piece 10 are each penetrated by a pin 17, which is secured by circlips 18 on the outer wall of the narrow-side pieces 15 against being pulled out.

Figure 6:
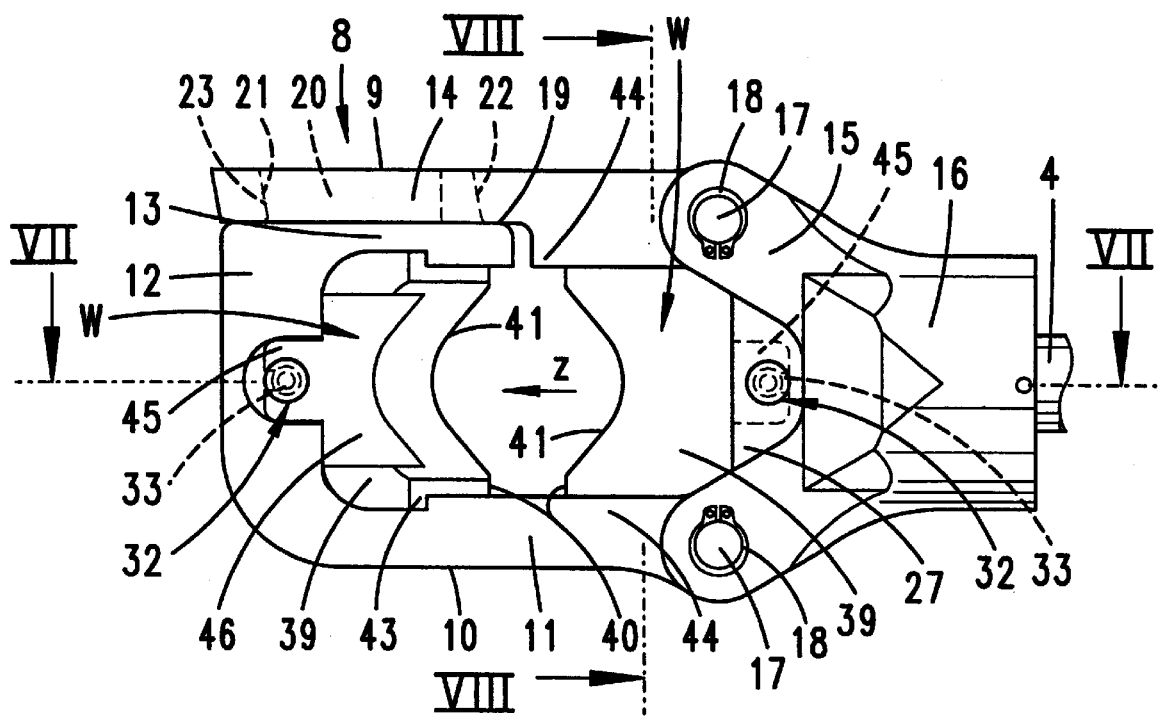
FIG. 6 shows a side view of the mounting head in operating position, with cutting tools arranged in the mounting head, in a first embodiment.

The longitudinal-side piece 14 of the rectangular guide 9 can be brought into overlap with the longitudinal-side portion 13 of the angled piece 10, for which purpose the latter has a thickness corresponding approximately to half the thickness of the longitudinal-side piece 14 in the region of the joint. On its underside, the piece 14 has an open-edged recess 19 which is associated with the longitudinal-side portion 13, the length of this recess being somewhat greater than the length of the longitudinal-side portion 13. The latter can be accommodated fully in the recess 19 to form a side piece with a uniform thickness and width all the way along (in this connection see also FIG. 6).

To fix the angled piece 10 or, more specifically, its longitudinal-side portion 13 on the longitudinal-side piece 14, the longitudinal-side portion 13 is provided on its upper side with an elongate projection 20, the front end region 21 of which, which faces the narrow-side piece 12, is undercut. This projection 20 enters a correspondingly shaped and aligned longitudinal slot 22 in the longitudinal-side piece 14, and this longitudinal slot 22 also has an undercut end zone 23. In the closed position according to FIG. 6, the angled piece 10 is thus held in a positive-locking manner by its projection 20 in the longitudinal slot 22 of the longitudinal-side piece 14 and it therefore requires deliberate action to effect opening of the mounting head 8.

The two pieces rotatably mounted between the narrow-side pieces 15—angled piece 10 and longitudinal-side piece 14—are biassed in the opening direction. The relevant springs bear the reference numerals 24 and 25.

In the embodiment example illustrated, two adjacently located grooves 26 extending in the longitudinal direction of the mounting head 8, i.e. parallel to the piston axis, are furthermore machined into the longitudinal-side pieces 11 and 14 and also into the longitudinal-side portion 13 complementing the longitudinal-side piece 14 on the inside. These grooves extend over the entire length between the narrow-side pieces 12 and 15.

Located between the two narrow-side pieces 15 is a slide 27, which is in connection at the rear with the hydraulic cylinder 4. At the top and bottom, this slide 27 has respective raised tongues 28 for guiding it in one of the grooves 26. However, it is also conceivable to provide just one tongue 28, this being at the top or the bottom.

At the rear, facing the hydraulic cylinder 4, the hammer-head-like slide 27 has a centrally located spigot 29 which sits in a correspondingly formed central hole 30 in the hydraulic cylinder 4, the said hole starting from the end face. The spigot 29 is held captive in this hole 30 in a positive-locking manner by a transverse pin 31.

Two securing means 32, each associated with the narrow sides, are provided for the purpose of fixing the tools W in the mounting head 8 or, more specifically in the rectangular guide 9. These securing means are formed as positive-locking pins 33 which can be displaced transversely to the direction of motion of the tools W and of the hydraulic cylinder 4 and, accordingly, likewise transversely to the longitudinal direction of the mounting head 8 which is provided in the form of a rectangular guide 9.

One securing means 32 is located centrally on the narrow-side piece 12. The second securing means 32 is positioned on the displaceable slide 27.

Figure 7:
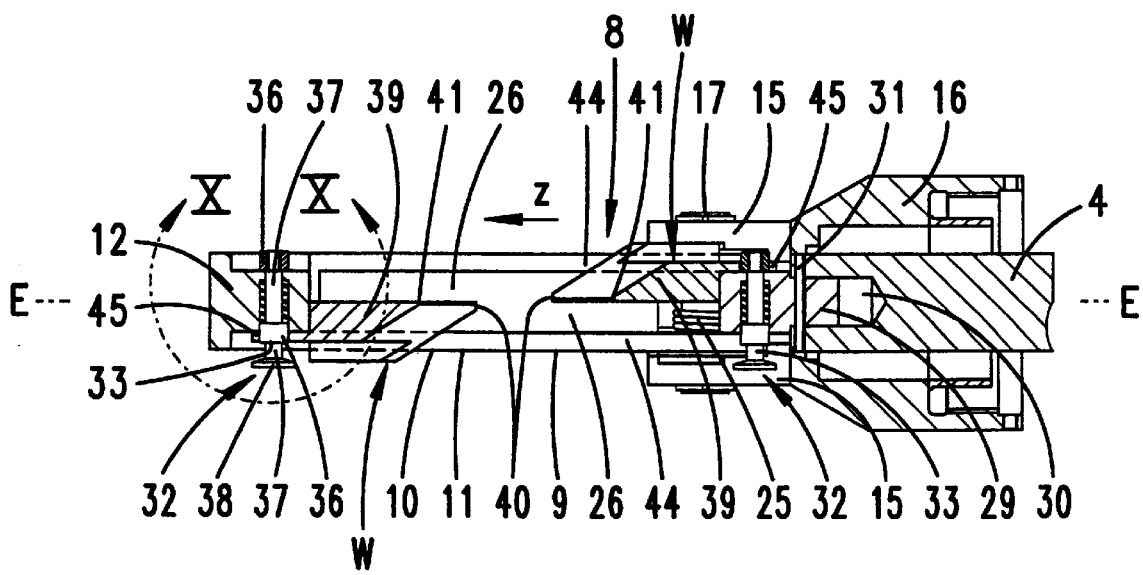
FIG. 7 shows the section according to the line VII'VII in FIG. 6.
Figure 12:
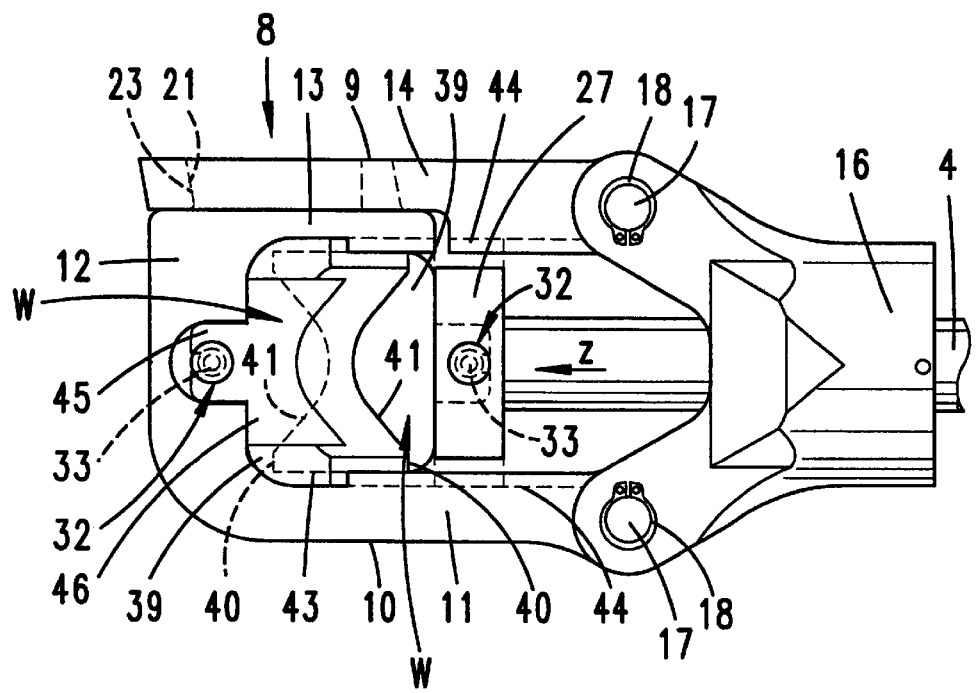
FIG. 12 shows a view corresponding to that of FIG. 6 but with the movable workpiece displaced fully forwards.
Figure 13:
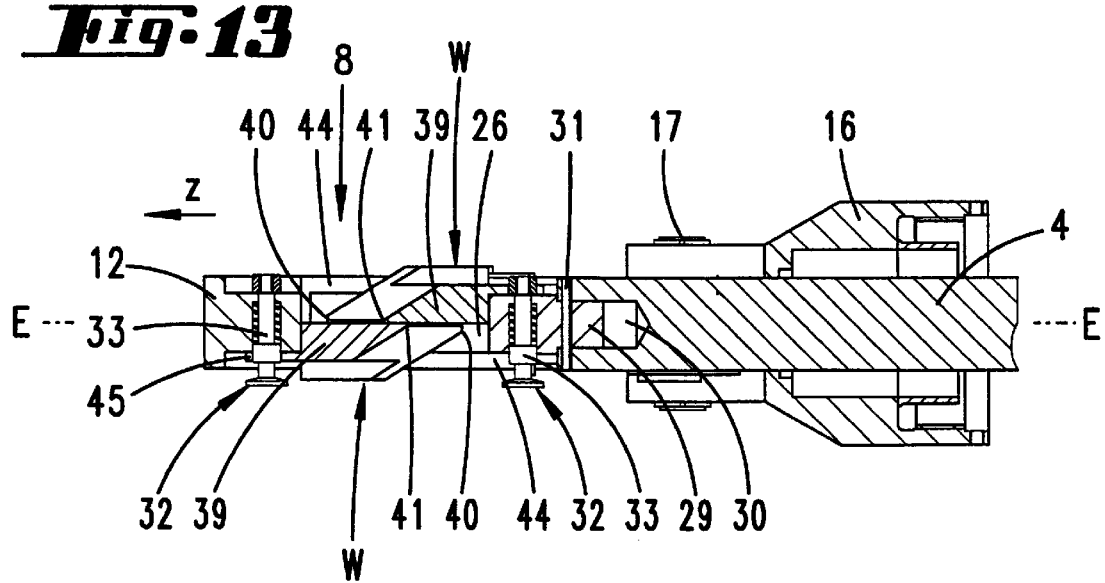
FIG. 13 shows a sectional view corresponding to that of FIG. 7, but relating to the position according to FIG. 12.

As can be seen, in particular, from the sectional view in FIG. 10, the securing means 32 formed by a positive-locking pin 33 can be displaced against a spring 35 inserted into a stepped hole 34 in the narrow-side piece 12 (and in the slide 27). FIG. 7 shows the initial position of the securing means 32 for the positive fixing of the tool W. FIG. 10 shows the securing means 32 after a displacement of the means in the direction of arrow r into a release position for the tool W.

The positive-locking pin 33 has sections of different diameter arranged axially one after the other; for instance, two positive-locking sections 36 of larger diameter, adjoining which in the direction r of displacement of the securing means 32 are release sections 37 of reduced diameter. To facilitate actuation of the securing means 32, it is provided at one end with a dish-like actuating plate 38.

The form of the fixing means 32 is furthermore chosen in such a way that positive-locking engagement with the tool W to be held can be achieved on both sides of the narrow-side piece 12 and the slide 27, i.e. on both sides at the ends of the fixing means 32.

FIGS. 5 and 5a show the mounting head 8 held in the open position, with various pairs of tools W and pairs of adaptors A which can be associated with it, the latter being for receiving commercially available tools W'. The latter tools W', which can be associated by means of adaptors A, are preferably pressing tools. The tools W which can be located and displaced directly in the mounting head 8 are preferably provided as cutting tools.

FIGS. 6 to 13 show the arrangement of a first pair of cutting tools W. These cutting tools W are formed as identically shaped cutting jaws 39 and are arranged in mirror symmetry in the mounting head 8.

As can be seen from the detail view of the two cutting jaws 39 shown in FIG. 11, these jaws have undercut cutting edges 41 extending, with a concave curvature in the direction z of displacement, on the end faces 40 which lie opposite one another in the direction z of displacement.

Unlike the configuration described previously, the cutting jaws 39 are guided in a mounting head 8 using just one groove 26 formed to be of appropriate width, each cutting jaw 39 taking up half the width of the groove when viewed transversely to the direction z of displacement, thereby allowing the cutting jaws 39 to move past one another.

Each cutting jaw 39 has two adjacent tongues 42, 43 extending in the direction z of displacement of the tool W to form a tongue and groove arrangement, tongue 42 lying in groove 26, with the width of the tongue corresponding approximately to half the width of the groove.

Tongue 43 overlaps the outwardly-located groove wall 44 formed by the groove 26, having a tongue width which corresponds approximately to half the width of the tongue 42. As a result of this configuration, the tools W—here the cutting jaws 39—are guided in a common groove 26 with additional support on oppositely-located outer surfaces of groove walls 44.

The tongues 42 and 43 extend over the entire length of the respective cutting jaw 39, as viewed in the direction z of displacement, the respective free end face 40 being bevelled approximately at an angle of 45°.

Each tool W—here cutting jaw 39—is held on the mounting head 8 or, more precisely on the narrow-side piece 12, on the one hand, and on the slide 27, on the other hand, by means of a mounting lug 45. This mounting lug 45 is in alignment with an outer surface 46 of the tool W, the tongues 43 engaging over the groove wall 44 projecting beyond this outer surface 46.

In the direction z of displacement of the tool W, each mounting lug 45 projects beyond the rear boundary surface 47 of the tool and is here formed centrally in terms of height. In the exemplary embodiment illustrated, the mounting lug 45 is formed integrally with the tool W.

The mounting lug 45 is formed fork-shaped, with a relatively small insertion opening 48 which changes into an enlarged central retaining opening 49.

The width of the insertion opening 48 is somewhat larger than the diameter of the release section 37 of the positive-locking pin 33. The retaining opening 49 has a diameter which corresponds substantially to that of the positive-locking section 36 of the positive-locking pin 33.

To put the apparatus 1 into operation with the tools W shown in FIGS. 6 to 13, a tool W or cutting jaw 39 must be positioned such that its mounting lug 45 enters into the region of the securing means 32. By displacement of the positive-locking pin 33 in the direction of arrow r, insertion of the release section 37 into the retaining opening 49 is enabled by displacement of the cutting jaw 39. Release of the positive-locking pin 33 by letting it go effects subsequent return displacement of the pin with spring assistance for positive engagement of the positive-locking section 36 in the retaining opening 49 of the mounting lug 45. The cutting jaw 39 is then fixed in a positive-locking manner, both as regards the one cutting jaw 39 on the narrow-side piece 12 and as regards the other cutting jaw 39 on the slide 27. In the region of the positive-locking pin 33, the narrow-side piece 12 has depressions on both sides to accommodate the mounting lug 45.

By actuation of the apparatus 1, e.g. by pressing actuation of the button 5, the slide 27 is moved in the direction z of displacement by the hydraulic cylinder 4, taking along the tool W associated with it—here the cutting jaw 39. In the course of the cutting operation, the cutting edges 41 of the tools W are guided past one another (cf. FIGS. 12 and 13). During this cutting operation, force-dependent control of the apparatus 1 is effected.

FIGS. 14 to 17 show another exemplary embodiment of a cutting tool W with cutting jaws 50. As in the exemplary embodiments described above, these also are guided in a common groove 26 in the mounting head 8.

These cutting jaws 50 are likewise of identical form and arranged in mirror symmetry in the mounting head 8.

Each cutting jaw 50 or tool W has a tongue 42, the width of which measured transversely to the direction z of displacement corresponds to the width of the groove 26.

The working width of the tool is chosen to be less than the width of the tongue. In this specific case, a working width a chosen for the tool corresponds approximately to half the width b of the tongue.

The arrangement is furthermore chosen in such a way that an outer surface 46 of the working portion of the tool W is flush with an outer surface of the tongue 42. Accordingly, the working region extends transversely to the direction z of displacement as far as the centre of the tongue 42.

To allow the cutting jaws 50 to move past one another in the direction z of displacement, the respective length of a tongue 42 measured in the direction z of displacement is less than the total length of the tool W or the cutting jaw 50. In the exemplary embodiment illustrated, the tongue 42 starts from a rear boundary surface 47 and extends over approximately half the total length of the tool W. In this manner. interpenetration of the cutting jaws 50 is enabled, the tongue sections which project beyond the working width of the tool receiving the working region of the other tool W which projects in the direction z of displacement.

By virtue of the configuration chosen, the tools W in this embodiment are guided on the outside by the groove walls 44.

A mounting lug 45 projecting relative to the outer surface 46 is associated with each tool W, here each cutting jaw 50, which mounting lug 45 is, for example, connected to the cutting jaw 50 by riveting.

The arrangement and positive mounting of the cutting jaws 50 is effected in the same way as in the previously described exemplary embodiment, by means of the displaceable positive-locking pins 33.

In FIGS. 18 to 21, there is shown another exemplary embodiment of tools W in the form of cutting jaws 51, which are guided in two mutually adjacent grooves 26 in the mounting head 8.

The width of each cutting jaw 51 measured transversely to the direction z of displacement corresponds to half the spacing dimension between the outwardly-disposed groove walls 44 of the mounting head 8. For guidance in an associated groove 26, each cutting jaw 51 has a tongue 42, accordingly two opposite-located tongues 42 to match each of the oppositely-located grooves 26. The tongue width is selected correspondingly less than the total width of the tool W.

Here too, the cutting edges 41 are formed with a concave curvature with an undercut, an arrangement of the cutting edges 41 in the tongueless region of the cutting jaw 51 being chosen.

The cutting jaws 51 are supported at the outside by the outwardly-disposed groove walls 44. Support on the inner side is provided by the inner groove wall 52 separating the grooves 26.

The mounting lugs 45 used to fix the cutting jaws 51 are provided on the outer surface 46 as in the exemplary embodiment described above, being, for example, connected to the cutting jaws 51 by rivetting.

On actuation of the apparatus 1, the cutting jaw 51 that can be connected in a positive-locking manner to the slide 17 can be moved past the fixed tool—here the cutting jaw 51 joined in a positive-locking manner to the narrow-side piece 12.

Irrespective of which of the three exemplary embodiments described above and shown in FIGS. 6 to 13, 14 to 17 or 18 to 21 is considered, the cutting plane E is located centrally with respect to the mounting head 8, when viewed in the direction z of displacement, i.e. for a construction with a groove 26 at its centre, and for an arrangement of two grooves 26 running alongside one another, centrally with respect to the inner groove wall 52 separating them.

The path of displacement of the movable tool, i.e. the cutting jaw 39, 50 or 51 associated with the slide 27, is furthermore always dimensioned in such a way that, in the maximum displacement position, its cutting edge 41 lies behind the cutting edge 41 of the fixed cutting jaw 39, 50 or 51 in the direction z of displacement. As mentioned, force-dependent control of the apparatus is also effected during a cutting operation. Automatic stopping of the forward displacement of the hydraulic cylinder 4 within the apparatus 1 and, in addition, automatic return travel of the piston together with the associated slide 27 and the tool W mounted on it into the initial position is effected by the movable cutting jaw striking, for example, against the narrow-side piece 12 carrying the fixed jaw, and the associated rise in the opposing force.

FIGS. 22 and 23 show, in another embodiment, tools W in the form of profile cutting jaws 53 for cutting to length elongate profiles, in particular drawn profiles. Each cutting jaw 53 is formed substantially plate-shaped, with a length/height ratio of about 3:2, the longer side extending in the direction z of displacement. The thickness of each cutting jaw 53, measured transversely to the direction z of displacement, corresponds to half the spacing between the outer groove walls 44 bounding the two grooves 26 located alongside one another. In the installed situation, the outer surface 46 of each profile cutting jaw 53 is aligned with the outer surfaces of the groove walls 44, according to FIGS. 22 and 23.

For the purpose of guiding the profile cutting jaws 53, these are provided at the top and bottom with tongues 28 for guiding them in the grooves 26 in the mounting head. The tongues 28 extend over the entire length of each cutting jaw 53.

Mounting sections 45 projecting beyond the rear boundary surface 47 are secured, in particular riveted, to the outer surface 46.

The two profile cutting jaws 53 forming a pair of tools have identical cut-outs 54 which pass transversely through each cutting jaw 53 and correspond to the profile cross section of the workpiece to be cut to length. Thus in the exemplary embodiment illustrated, the cut-out 54 chosen corresponds to an unclosed hollow profile of rectangular cross section.

In the stop-limited initial position according to FIG. 22, the profile cutting jaws 53 are positioned in such a way relative to one another that their cut-outs 54 coincide. In this position, the workpiece to be cut to length can be pushed through the coinciding cut-outs 54.

Here, as in the exemplary embodiments described above, the cutting plane E lies centrally between the two outer groove walls 44, parallel to the direction z of displacement, and is therefore situated centrally on the inner groove wall 52, which separates the two grooves 26 of the mounting head 8 from one another.

By actuation of the apparatus 1, the cutting jaw 53 secured to the slide 27 by the mounting lug 45 is displaced parallel to the fixed cutting jaw 53 mounted on the narrow-side piece 12. There is thus effected a simultaneous parallel displacement of the -cut-outs 54, which results in cutting of the workpiece in the region of the cutting plane E. The cross-sectional shape of the workpiece is always maintained by virtue of the fact that the boundary walls of the cut-outs are surrounded on all sides. No deformations occur in the region of the cutting plane E.

FIGS. 24 to 29 show various embodiments of adaptor arrangements in the mounting head 8 for holding commercially available tools W' to be used with known pressing devices, in particular pressing tools.

Figure 24:
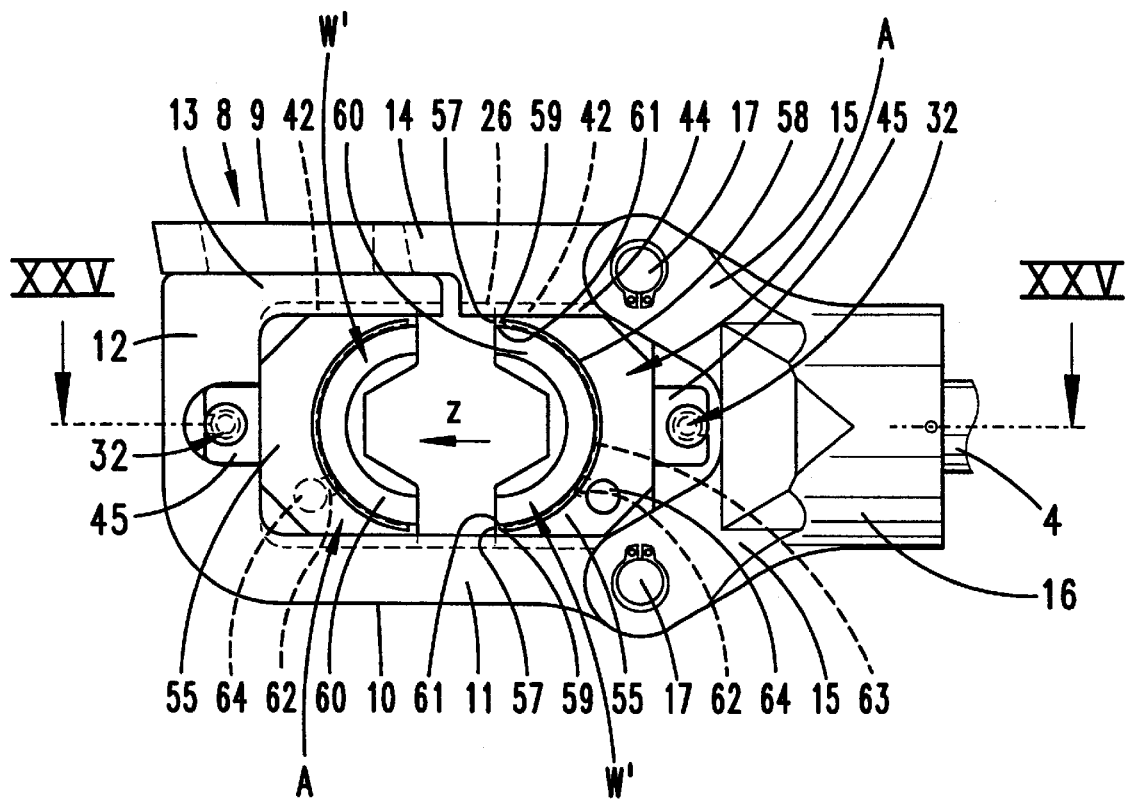
FIG. 24 shows another side view of the mounting head with tools in a fifth embodiment.
Figure 25:
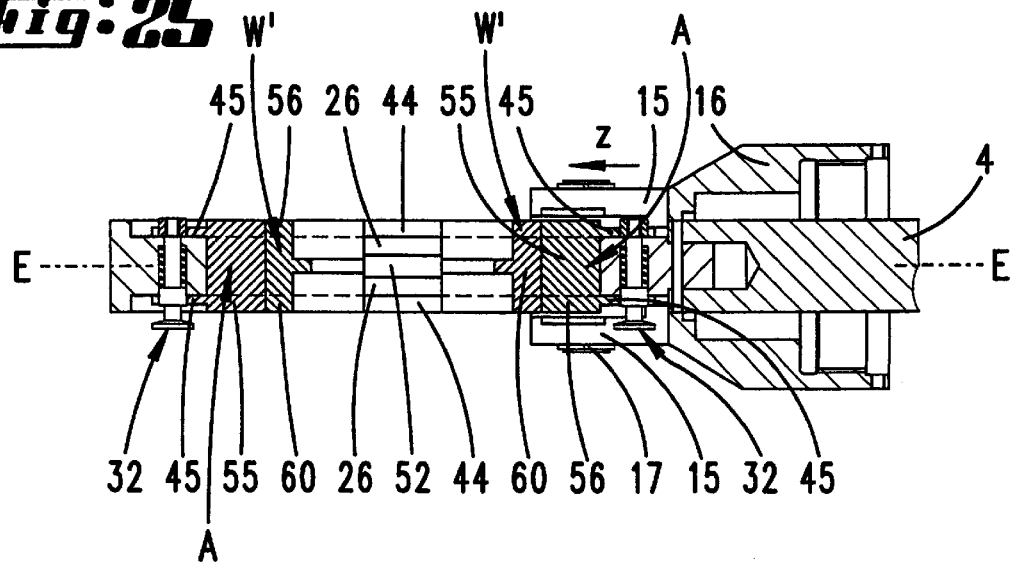
FIG. 25 shows the section according to the line XXV—XXV in FIG. 24.

FIGS. 24 to 25 show a pair of adapters in the form of latch-in mounts 55. At the top and bottom, these each have two tongues 42 guided in the grooves 26 in the mounting head 8. The latch-in mount 55 extends beyond the tongues 42 on both sides of the tongues 42, i.e. transversely to the direction z of displacement, to form a respective projecting shoulder 56, giving a total width of each latch-in mount 55 which corresponds to that of the mounting head 8 and of each longitudinal-side piece 11 and 14. The respective outer surface 46 of each latch-in mount 55 is accordingly aligned with the associated outer surface of the mounting head 8 or the rectangular guide 9.

Each latch-in mount 55 is provided with two oppositely-located mounting lugs 45. This results in a fork-shaped configuration of the mounting region. The two mounting lugs 45 accommodate between them either the tapered mounting region of the narrow-side piece 12 or the slide 27. Both positive-locking sections 36 of each positive-locking pin 33 come into effect here in that each positive-locking section 36 enters in a positive-locking manner into the respectively associated retaining opening 49 of the mounting lug 45.

In terms of the plane in which they are located, the mounting lugs 45 are arranged set back relative to the outer surface 46 of the latch-in mount 55, i.e. transversely to the direction z of displacement, because of the projecting shoulder 56 provided in each case.

To accommodate a tool W'—here a pressing tool—each latch-in mount 55 is provided, on the end faces 57 which are disposed opposite one another in the direction z of displacement, with cut-outs 58 which extend curved in the direction z of displacement. In the exemplary embodiment illustrated, the cut-outs are formed to be of semi-circular shape in a side view in accordance with FIG. 24.

Before a transition to the remainder of the end surfaces 57, which run perpendicularly to the direction z of displacement, the end regions of the cut-outs are formed as inwardly-directed ribs 59 extending transversely to the direction z of displacement. According to the exemplary embodiment illustrated, these ribs 59 can extend over the entire width, measured transversely to the direction z of displacement, of each latch-in mount 55. However, it is also conceivable for these ribs 59 to be provided shortened at one end.

Tools W' in the form of pressing jaws 60 formed to be correspondingly semicircular can be inserted laterally, transversely to the direction z of displacement, into these cut-outs 58 provided with the ribs 59, the pressing jaws 60 having grooves 61, corresponding to the ribs 59. By virtue of this configuration, the commercially available pressing jaws 60 are held in a positive-locking manner in the adaptors A.

For secure fixing of the pressing jaws 60 in the adaptors A, the latter have a, preferably spring-supported, latching projection 62 in the rear region of each cut-out 58, this projection entering into an associated rear groove 63 in the associated pressing jaw 60 (compare in this connection FIG. 5a).

To cancel this latching and remove the pressing jaws 60, each adaptor A has on its outer surface 46 a finger-actuatable releasing device 64, by which a reverse displacement of the latching projection 62 is enabled when the pressing jaw 60 is pulled out laterally.

Figure 26:
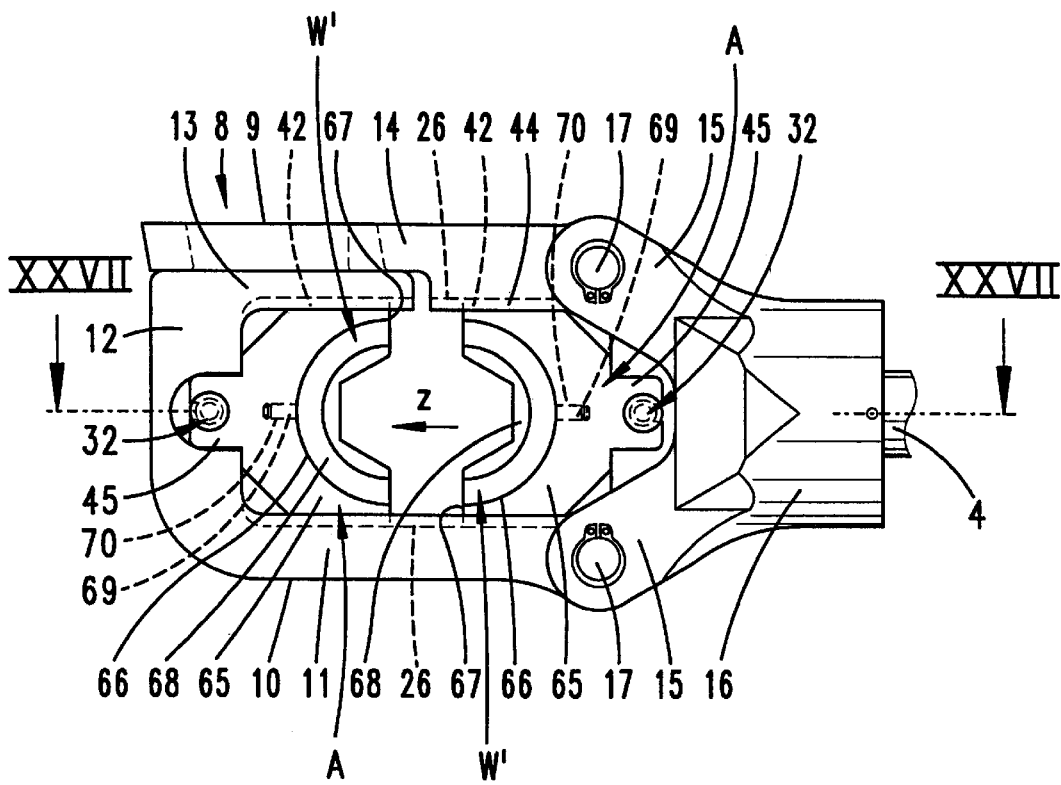
FIG. 26 shows the mounting head in side view with tools in a sixth embodiment.
Figure 27:
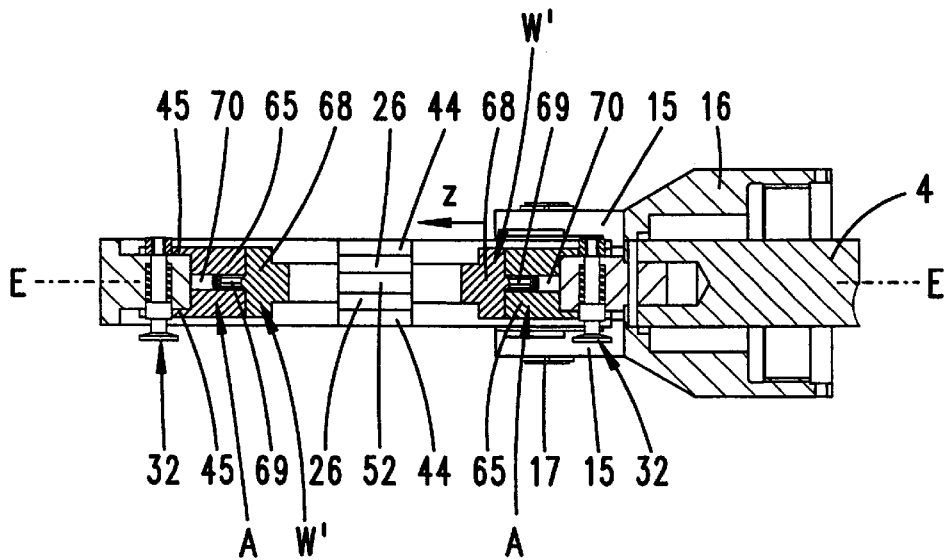
FIG. 27 shows the section according to the line XXVII—XXVII in FIG. 26.

In FIGS. 26 and 27, there is shown another exemplary embodiment of an adaptor A, the latch-in mounts 65 of which are likewise provided with two oppositely-located mounting lugs 45, the outer surfaces of which are aligned with the outer surfaces 46 of the adaptor A. In addition, this latch-in mount 65 is provided both at the top and at the bottom with two tongues 42 running parallel to one another as in the exemplary embodiment described above.

Furthermore, this latch-in mount 65 also has a cut-out 66 which is semicircular in side view in accordance with FIG. 26 and the end regions of which open into end-face stubs 67 extending perpendicularly to the direction z of displacement.

These adaptors A serve to receive tools W'—here pressing tools 68—which have a semicircular contour formed to correspond to the cut-outs 66. As in the exemplary embodiment described above, these pressing tools 68 are accommodated fully in the cut-out section of the adaptor A, so that the end faces of the pressing tools 68 lying opposite one another in the installation position according to FIG. 26 are aligned with those of the adaptors A.

To fix the pressing tools 68 in the latch-in mounts 65, the pressing tools 68 are provided centrally at the rear with pins 69 aligned in or counter to the direction z of displacement for entry into corresponding receiving features 70 in the latch-in mounts 65. In this way, a kind of catch coupling is provided.

Figure 28:
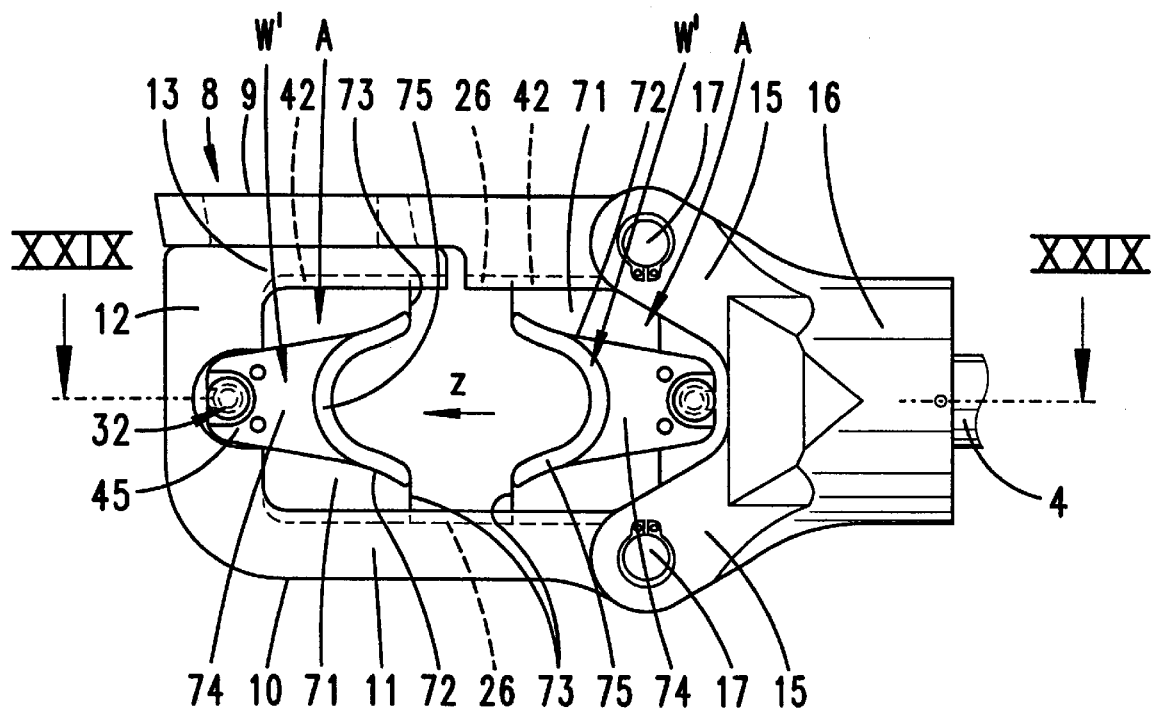
FIG. 28 shows another side view representation of the mounting head with tools of another embodiment.
Figure 29:
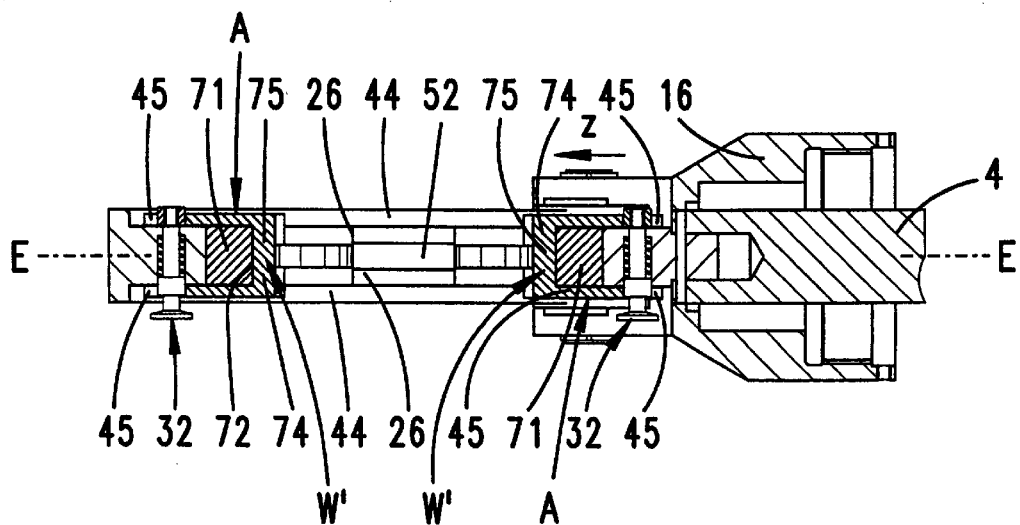
FIG. 29 shows the section according to the line XXIX—XXIX in FIG. 28.

FIGS. 28 and 29 show an exemplary embodiment in which an adaptor A is used merely to guide and align a commercially available tool W. Here, each adaptor A is provided as a guide piece 71 with two tongues 42 running parallel provided at the top and bottom. Each outer surface 46 is flush with the associated tongue 42, and this adaptor A thus extends between the groove walls 44 of the mounting head 8.

This guide piece 71 also has a cut-out 72 which is semicircular in side view in accordance with FIG. 28 and opens into end-face stubs 73 extending perpendicularly to the direction z of displacement.

The associated tool W'—here pressing tool 74—is formed fork-shaped, each limb of the fork being shaped as a mounting lug 45. The tool head 75 is shaped to correspond to the cut-out 72 of the adaptor A and, accordingly, lies in a positive-locking manner in this region.

The mounting lugs 45 overlap the adaptor A to fix adapter A and tool W', the adaptor A being held captive between the tool W' and the narrow-side piece 12 and, respectively, between the tool W' and the slide 27. The tool W' is accordingly secured by engagement of the adaptor A over it.

Further embodiments of adaptors A for receiving tools W' are furthermore conceivable. Thus, FIG. 5a shows two further embodiments, in which, on the one hand, a latch-in mount 76 provided with two mounting lugs 45 located opposite to one another is provided in the region of a cut-out with grooves extending in the direction z of displacement to receive a tool W' formed as a pressing tool 77 and having correspondingly aligned tongues to form a tongue and groove connection.

Adaptors A are furthermore shown in the form of latch-in mounts 78. These likewise have two tongues 42 at the top and bottom. The outer surfaces 46 of these adaptors A are aligned with those of the tongues 42. Here, a mounting lug 45 is provided in each case, this lug engaging on the outer surface 46 and being connected, in particular riveted, to the adaptor A.

In this exemplary embodiment, the latch-in mount 78 has projections in the form of tongues extending in the direction z of displacement in the region of a U-shaped cut-out open towards the oppositely-located adaptor A. These projections are received by correspondingly shaped grooves in the tool W' to be inserted—here a pressing tool 79.

Figure 30:
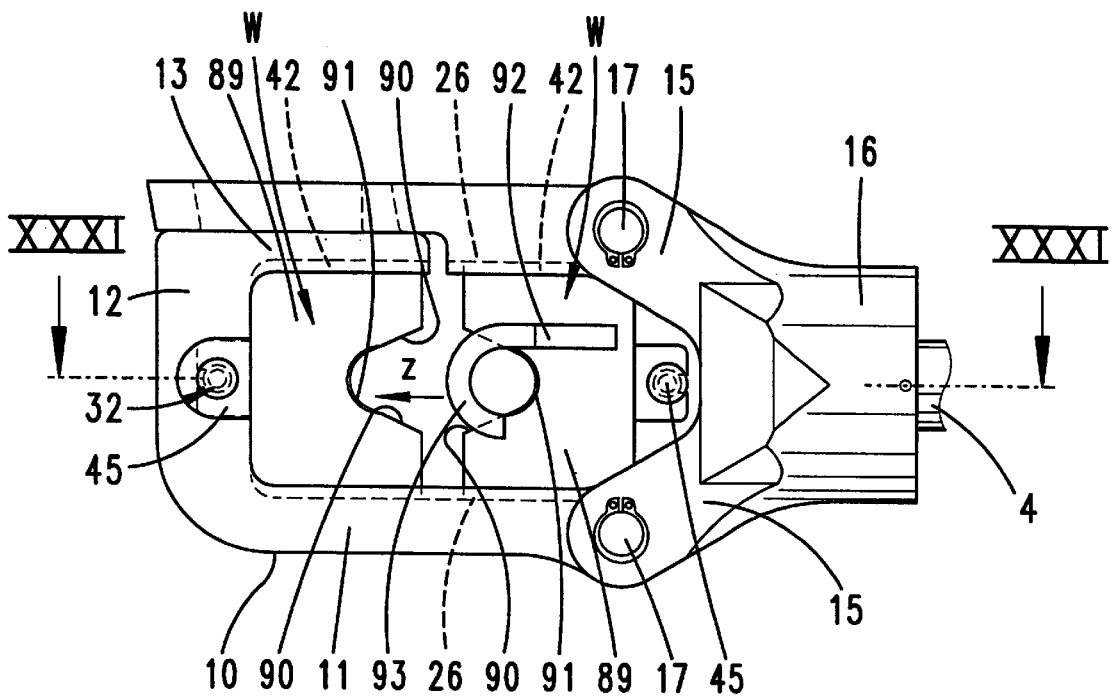
FIG. 30 shows a side view representation of the mounting head with tools of an eighth embodiment.
Figure 31:
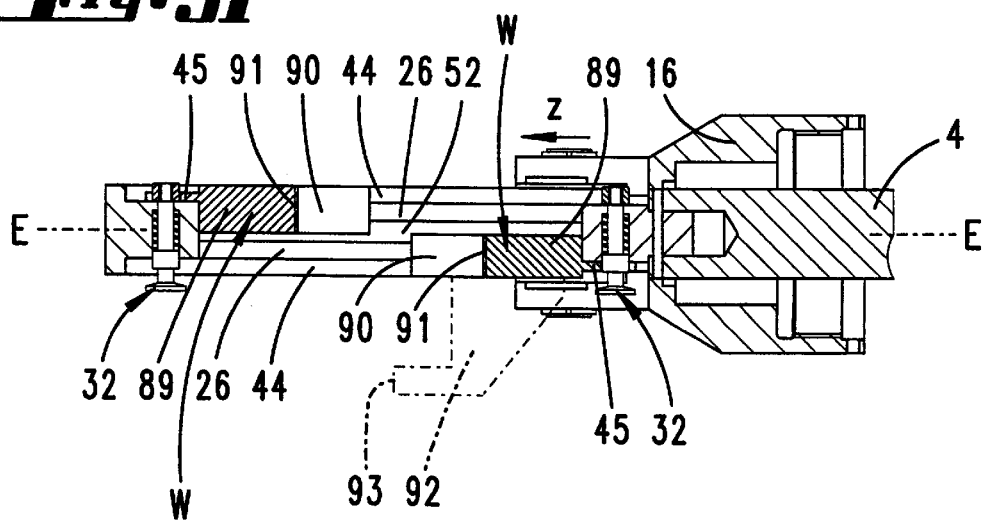
FIG. 31 shows the section according to the line XXXI—XXXI in FIG. 30.

In the representations of FIGS. 30 and 31, there is shown another embodiment of a tool W for cutting threaded rods.

The cutting jaws 89, which are each provided with a tongue 42 at the top and bottom, have a width, measured transversely to the direction z of displacement, which corresponds approximately to twice the width of the tongues. The mutually facing end faces 40 extend substantially at right angles to the outer surface 46.

Each tool W or cutting jaw 89 is provided with a recess 90 which widens towards the respective end face 40. In a side view in accordance with FIG. 30, this recess 90 approximates to a triangle, the tip of which, which faces away from the other tool W, is rounded. More specifically, this tip region is of semicircular shape in plan view. The surf aces of the recess adjoin this tip region tangentially. The recess 90 passes through the tool W over its entire width.

The tip region is provided with a thread to form an externally threaded section 91.

The side edges of the oppositely-located externally threaded sections 91, which side edges lead past one another in the cutting plane E, form cutting edges 41.

At the side, the cutting jaw 89 to be connected to the slide 27 has an extension 92 which extends at right angles to the outer surface 46 and at the free end of which a shell-shaped support 93 is provided, the support being located at a spacing from the outer surface 46. In a side view in accordance with FIG. 30, the support 93 has a semicircular shape which, in a projection onto the outer surface 46, represents a complement to the semicircular externally threaded section 91. Accordingly, the shell of the support 93 is aligned coaxially with the externally threaded section 91, with a semicircular opening which lies opposite that of the externally threaded section 91. As a result of this configuration, cutting of threaded rods is enabled, the shell-shaped support 93 preventing the threaded rod from being pulled askew.

Moreover, in FIGS. 32 to 33, an arrangement is shown in which a receiving member 101 in the form of two adaptors is located in the mounting head 8 for the arrangement and control of a working component 102 in the form of tools W' disposed outside the mounting head 8. In this exemplary embodiment, the pair of tools forms a shears-type tool 100, in particular a bolt cutter 80.

The adaptors A each have a wide tongue 42 at the top and bottom to guide them in a wide groove 26 formed in the mounting head 8 between two groove walls 44. In this case, it would be perfectly conceivable to have a construction with two tongues 42 guided in two parallel grooves 26 as in the exemplary embodiments described above.

Each adaptor A has two oppositely-located mounting lugs 45 for forked fixing on the narrow-side piece 12, on the one hand, and on the movable slide 27, on the other hand.

That adaptor A of the receiving member 101 which is associated with the narrow-side piece 12 is formed as a fixed part 106 and projects on one side from the region of the mounting head 8 to form a mounting section 81 which extends in the direction z of displacement and projects freely at the front beyond the free end of the mounting head 8. At its free end, on the inner side facing the mounting head 8, the said mounting section carries a fixed jaw 82 of the bolt cutter 8. The fixed jaw 82 is accordingly substantially in extension of the mounting head 8, an end face 83 of the fixed jaw 82, the said end face facing the mounting head 8, being at a spacing from the associated end face of the narrow-side piece 12 of the mounting head 8 in order to allow the receiving member 101 to be pushed on and, finally, fixed by the positive-locking engagement of securing means 32 and mounting lugs 45.

Pivoting jaw 85 of the shears type tool 100 is mounted movably on the fixed jaw 82 by means of a pin 84.

The tool is controlled by means of a link 86, which is secured at one end to an arm 87 on the pivoting jaw, and at the other end, to that adaptor A of the receiving member 101 which is fixed to the slide 27 and is formed as a moving part 103. This link 86 extends at the side of the mounting head 8 and is mounted removably either in the region of the moving part 103 or in the region of the pivoting jaw 85 to allow mounting or removal of the adaptors A to be provided with the tool W'.

By actuation of the apparatus 1, this being associated with the displacement of the moving part 103 connected to the slide 27 in the direction z of displacement, the pivoting jaw 85 is pivoted about its pin 84, with simultaneous closing of the mouth 88 of the shears.

The mounting lugs 45, in particular those of the adaptor A forming the moving part 103, can be omitted if automatic return of the bolt cutter 80 is provided when reverse displacement of the hydraulic cylinder 4 takes place. Thus, for example, a spring located in the region of the pivot 84 can load the cutting jaws of the bolt cutter 80 into the open position, with the result that, when reverse displacement of the hydraulic cylinder 4 takes place, the downward-pivoting jaw 85 moves the moving part 103 back towards the hydraulic cylinder 4 in the same direction by way of the link 86.

Figure 34:
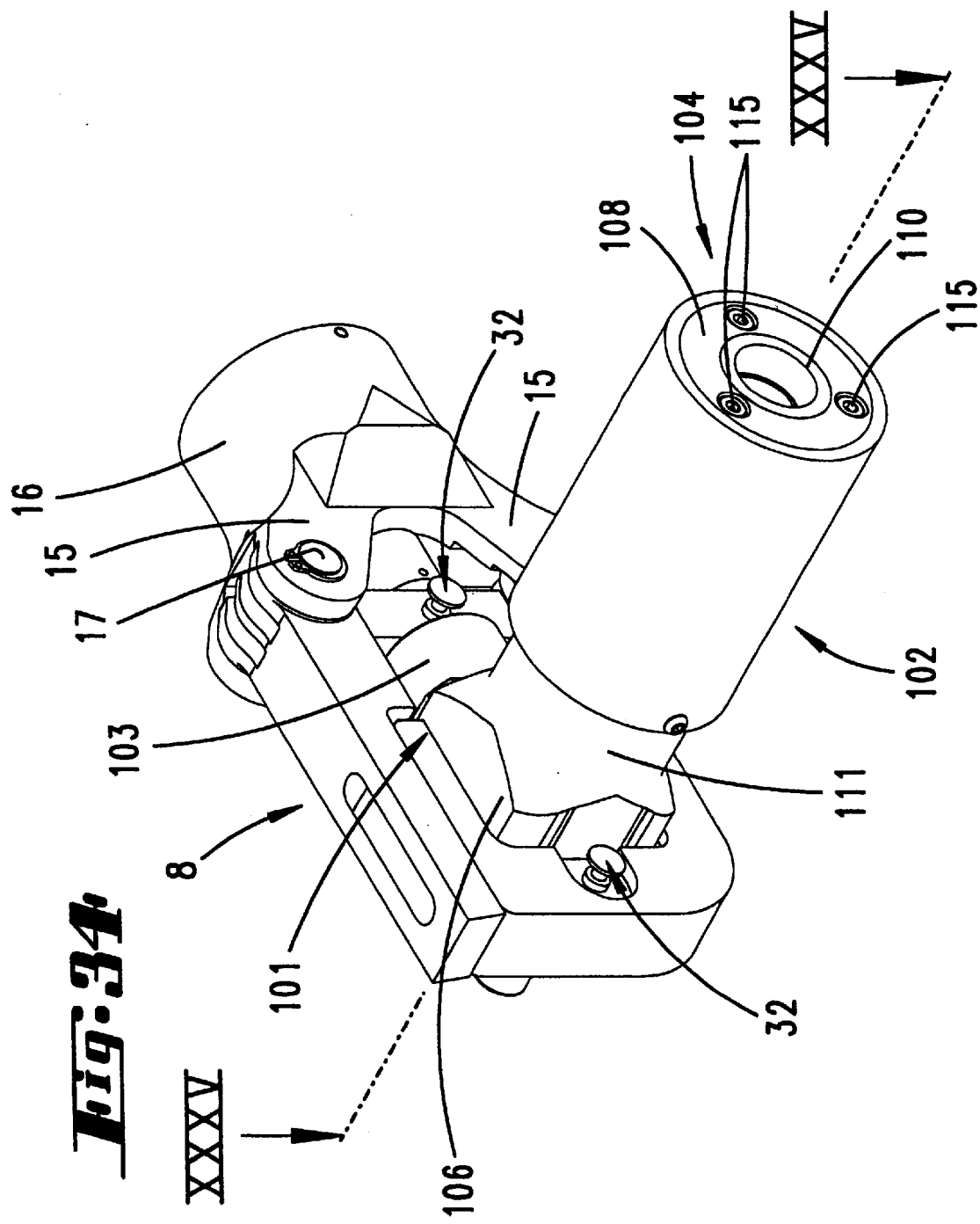
FIG. 34 shows a perspective view of an alternative tool in a mounting head, for forming a hole punch.
Figure 36:
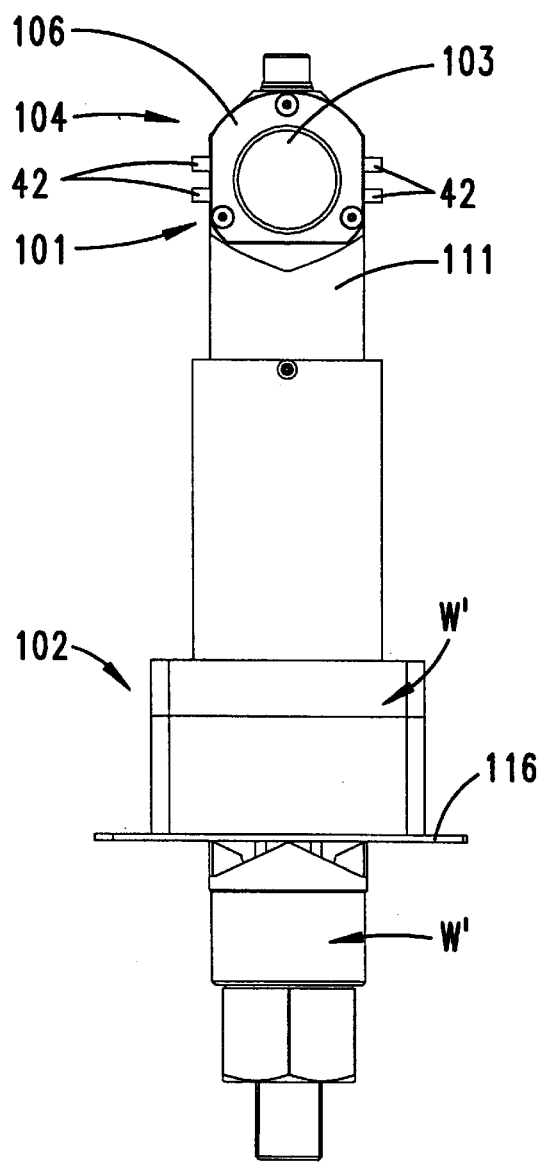
FIG. 36 shows the view in the direction of the arrow XXXVI in FIG. 35.
Figure 35:
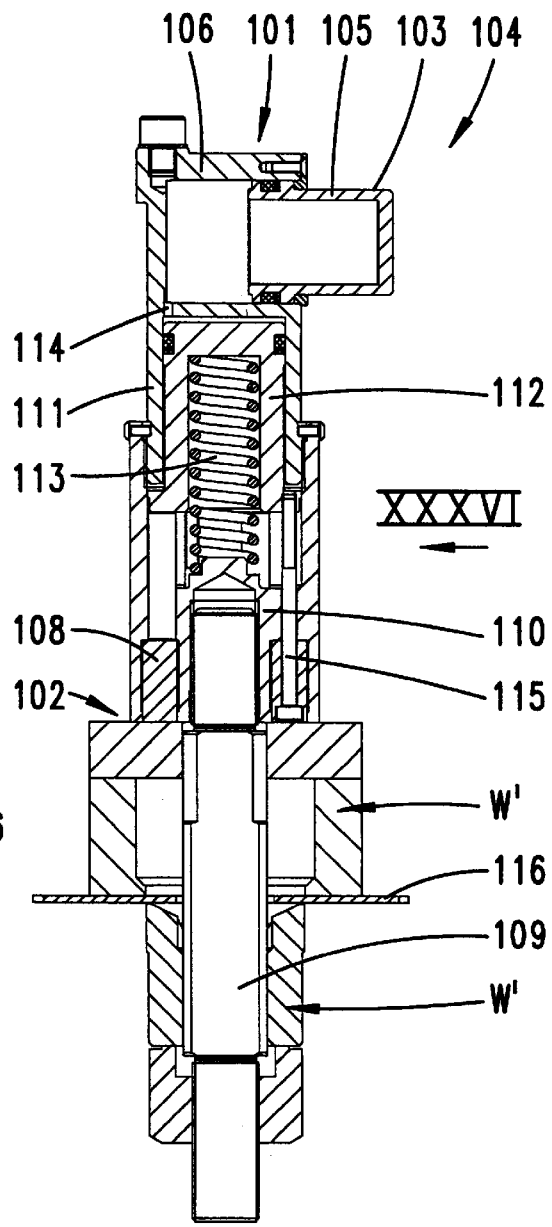
FIG. 35 shows the section according to the line XXXV—XXXV in FIG. 34, with the mounting head omitted.

FIGS. 34 to 36 show another embodiment. Here, the mounting head 8 is provided with tools W' to form a hole punch 104.

Here too, a, moving part 103 is provided which can be moved on the hydraulic cylinder 4 in grooves 26 in the mounting head 8 by means of mounting lugs 45 and which, in the exemplary embodiment illustrated, is formed as a hollowed-out piston 105.

A fixed part 106 associated with the narrow-side piece 12 is provided—if appropriate by way of mounting lugs—to complement the receiving member 101 held in the mounting head 8, which fixed part 106 is provided in the exemplary embodiment illustrated in the manner of a hollow cylinder and serves to accommodate the piston 105 on the moving part.

Consequently, the piston 105 forming the moving part 103 is at least partially accommodated in the fixed part 106 and guided in it in the direction z of displacement.

The fixed part 106 carries the actual hole-punching device, the alignment of the latter being selected perpendicular to the direction z of displacement and thus perpendicular to the direction of displacement of the piston 105.

The working part 102 aligned perpendicularly to the direction z of displacement has a counter-holder 108 and an anchoring device 110, which has an internal thread, for securing a tie bolt 109.

The counter-holder part 108 can be moved relative to the anchoring device 110, i.e. is arranged in such a way that it can be extended. The anchoring device 110, in contrast, is secured in a fixed manner to the fixed part 106, more specifically by means of a cylinder housing 111 for a hydraulic piston 112. The cylinder housing 111 has tongues 42 in accordance with the exemplary embodiments described above.

To move the counter-holder 108, it is acted upon by the hydraulic piston 112, which, for its part, is supported in its illustrated unactuated position on an underside of the fixed anchoring device 110 by means of a compression spring 113.

A quantity of hydraulic fluid is accommodated in the cavity—located on the fixed-part side—of the holding element 101 for the purpose of loading the hydraulic piston 112. The loading is effected by actuation of the apparatus 1, causing the moving part 103 formed as a piston 107 to travel into the cavity and, in the process, displace the quantity of hydraulic fluid through a side passage 114 aligned perpendicularly to the direction z of displacement, for the purpose of loading the rear side of the hydraulic piston 112.

The counter-holder 108 is connected firmly to the hydraulic piston 112 by means of retaining screws 115, the hydraulically induced displacement of the piston 112 thus resulting in an axial displacement of the counter-holder 108. In the course of this axial displacement, the counter-holder 108 or the tool carried by it passes over a counter-tool mounted on the tie bolt to punch holes in a metal sheet 116.

In this particular case, the configuration is chosen such that the counter-holder 108 carries a first tool W' and the hole punch 109 carries a second tool W', the cutting edges of which are guided past one another in the course of the cutting or punching operation.

As the hydraulic cylinder 4 moves back, reverse displacement of the piston 105 back into the initial position is simultaneously effected by means of the compression spring 113 acting on the hydraulic piston 112.

The arrangement can furthermore also be chosen in such a way that the hole-punching device forming the working part 102 is aligned coaxially with the moving part 103 or piston 107, for example when the entire device is arranged to the side, outside the mounting head 8.

All features disclosed are pertinent to the invention. The disclosure content of the associated/attached priority documents (copy of the prior application) is herewith also incorporated as to its full content into the disclosure of the application, also for the purpose of including features of these documents in claims of the present application.

What is claimed is:

1. Hydraulic apparatus for engaging a workpiece, comprising a mounting head configured to receive tools such that the tools are laterally offset relative to and moveable past one another, whereby the mounting head is adapted to receive different pairs of tools or tool-adapters respectively, wherein each of the tools or tool-adapters is guided in the mounting head in a groove extending in a direction of displacement of at least one of the tools or tool-adapters.

2. Apparatus according to claim 1 wherein the mounting head includes a plurality of grooves formed next to one another and the tools are guided in the grooves.

3. Apparatus according to claim 1 wherein the mounting head includes a common groove and the common groove includes groove walls that have opposite outer surfaces, wherein the tools are guided in said common groove and are supported by the opposite outer surfaces of the groove walls.

4. Apparatus according to claim 1 wherein the mounting head includes a common groove and the tools are guided in the common groove for interpenetrating each other.

5. Apparatus according to claim 1 wherein the mounting head is formed as a closable rectangular guide.

6. Apparatus according to claim 1 wherein the rectangular guide is of three-piece construction, once piece being provided as an angled piece which encloses one longitudinal side, one piece being provided as a narrow-side piece and one piece being provided as a longitudinal-side piece.

7. Apparatus according claim 6 wherein the angled piece is provided as a portion of a longitudinal side and overlaps the longitudinal-side piece.

8. Apparatus according to claim 1 wherein securing means for securing a tool in the mounting head are provided, in each case opposite one another, on the narrow-side piece of the mounting head.

9. Apparatus according to claim 8 wherein the securing means is formed as a positive-locking pin which can be displaced transversely to the direction of motion of the tools.

10. Hydraulic apparatus with a hydraulic cylinder moving a moveable tool, configured to perform a cutting operation and pressing operation, said apparatus comprising a mounting head configured to receive both cutting and pressing tools, such that a moveable tool is moveable against a fixed tool, wherein force-dependent control of the apparatus is effected both during a cutting operation and during a pressing operation, such upon exceeding of a predetermined maximum pressure return movement of the hydraulic cylinder is effected.

11. A hydraulic apparatus for engaging a workpiece, said hydraulic apparatus comprising a mounting head, said mounting head having a first groove formed therein and a second groove formed therein; a first tool disposed in said first groove in said mounting head; and a second tool disposed in said second groove in said mounting head, wherein said first groove and said second groove are configured such that said first tool and said second tool are laterally offset relative to each other and are moveable past one another, said first and second grooves extending in a direction of displacement of said first tool.

12. A hydraulic apparatus for engaging a workpiece, said hydraulic apparatus comprising a mounting head, said mounting head having a first groove formed therein and a second groove formed therein; a first adapter disposed in said first groove in said mounting head and carrying a first tool; and a second adapter disposed in said second groove in said mounting head and carrying a second tool, wherein said first groove and said second groove are configured such that said first tool and said second tool are laterally offset relative to each other and are moveable past one another, wherein said first and second grooves extend in a direction of displacement of said first adapter.

13. A system comprising a hydraulic apparatus and a plurality of different tools for use with the apparatus and engaging a workpiece, said hydraulic apparatus comprising a mounting head, said mounting head having a first groove formed therein and a second groove formed therein; wherein a plurality of the tools are receivable in said first groove in said mounting head and a plurality of the tools are receivable in the second groove in said mounting head, wherein said first groove and said second groove are configured such that the tool which is disposed in said first groove is laterally offset relative to and is moveable past the tool which is disposed in said second groove, said first and second grooves extending in a direction of displacement of the tool which is disposed in said first groove.

* * * * *